United States Patent
Mariappan et al.

(10) Patent No.: US 11,991,077 B2
(45) Date of Patent: May 21, 2024

(54) DATA INTERFACES WITH ISOLATION FOR CONTAINERS DEPLOYED TO COMPUTE NODES

(71) Applicant: Juniper Networks, Inc., Sunnyvale, CA (US)

(72) Inventors: Yuvaraja Mariappan, San Jose, CA (US); Rudhraraju Narasimha Kishore Varma, Bangalore (IN); Shailender Sharma, Bangalore (IN); Rakesh Kumar Reddy Varimalla, Bengaluru (IN); Jude Pragash Vedam, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/652,250

(22) Filed: Feb. 23, 2022

(65) Prior Publication Data
US 2022/0278927 A1 Sep. 1, 2022

Related U.S. Application Data

(60) Provisional application No. 63/242,434, filed on Sep. 9, 2021.

(30) Foreign Application Priority Data

Mar. 1, 2021 (IN) .............................. 202141008464
Mar. 1, 2021 (IN) .............................. 202141008548

(51) Int. Cl.
*H04L 45/586* (2022.01)
*H04L 45/02* (2022.01)
(Continued)

(52) U.S. Cl.
CPC ............ *H04L 45/586* (2013.01); *H04L 45/02* (2013.01); *H04L 45/745* (2013.01); *H04L 69/162* (2013.01)

(58) Field of Classification Search
None
See application file for complete search history.

(56) References Cited

U.S. PATENT DOCUMENTS 9,571,394 B1 2/2017 Sivaramakrishnan et al.
10,193,984 B2 * 1/2019 Haddad ................... H04L 43/18
(Continued)

FOREIGN PATENT DOCUMENTS

EP 3716533 A1 9/2020
WO 2013/0184846 A1 12/2013

OTHER PUBLICATIONS

Anonymous, "Kuryr Kubernetes vhost-user port integration", OpenStack, Aug. 6, 2020, 4 pp., http:/web.archive.org/web/20200806131715/https://docs.openstack.org/kuryr-kubernetes/latest/specs/stein/vhostuser.html.

(Continued)

*Primary Examiner* — Phirin Sam
(74) *Attorney, Agent, or Firm* — Shumaker & Sieffert, P.A.

(57) ABSTRACT

In general, techniques are described for deploying a logically-related group of one or more containers ("pod") that supports the Data Plane Development Kit (DPDK) to support fast path packet communication on a data channel between a virtual router and the pod. In an example, a computing device comprises a virtual router comprising processing circuitry and configured to implement, in a computing infrastructure that includes the computing device, a virtual network to enable communications among virtual network endpoints connected via the virtual network. The computing devices comprises a pod comprising a con- (Continued)

tainerized application, wherein the virtual router and the pod are configured to create a Unix domain socket using a file system resource that is accessible by the pod and by the virtual router and is not accessible by any other pods deployed to the computing device.

20 Claims, 7 Drawing Sheets

(51) Int. Cl.
  *H04L 45/745* (2022.01)
  *H04L 69/16* (2022.01)

(56) References Cited

U.S. PATENT DOCUMENTS

| | | | |
|---|---|---|---|
| 2019/0220260 A1* | 7/2019 | Gutman | G06F 11/1433 |
| 2020/0028868 A1* | 1/2020 | Sood | H04L 63/20 |
| 2020/0177629 A1* | 6/2020 | Hooda | H04L 47/125 |
| 2020/0348973 A1* | 11/2020 | Kutch | H04L 41/046 |
| 2021/0019194 A1* | 1/2021 | Bahl | H04L 67/1031 |
| 2021/0117249 A1* | 4/2021 | Doshi | H04L 67/1001 |
| 2021/0119878 A1* | 4/2021 | Loftus | H04L 41/12 |
| 2021/0133000 A1* | 5/2021 | Okman | G06F 9/545 |
| 2021/0144095 A1* | 5/2021 | Hanes | H04L 47/125 |
| 2021/0144517 A1* | 5/2021 | Guim Bernat | H04L 9/0637 |
| 2021/0218750 A1* | 7/2021 | Wells | H04L 69/162 |
| 2021/0377185 A1* | 12/2021 | Durrani | H04L 47/823 |
| 2023/0014785 A1* | 1/2023 | Karr | G06F 3/0655 |
| 2023/0022758 A1* | 1/2023 | Sears | G06F 3/0652 |

OTHER PUBLICATIONS

Bui, "Analysis of Docker Security", Aalto University T-110.5291 Seminar on Network Security, Cornell University Library, Jan. 2015, 7 pp.

Extended Search Report from counterpart European Application No. 22159178.7 dated Jul. 11, 2022, 10 pp.

Gigi, "Mastering Kubernetes", Packt Publishing Ltd., Jan. 2017, 400 pp., http://ndl.ethernet.edu.et/bitstream/123456789/40210/2/115.Gigi%20Sayfan.pdf.

"Hardware-Acceleration-Blueprint.md," GitHub, Netronome / opencontrail-blueprints, Nov. 30, 2016, 14 pp., retrieved from the Internet: URL: https://github.com/Netronome/opencontrail-blueprints/blob/master/Hardware-Acceleration-Blueprint.md.

"Virtio_user for Container Networking," Data Plane Development Kit, How to Guides, Jul. 14, 2018, 4 pp., Retrieved from the Internet: URL: https://doc.dpdk.org/guides/howto/virtio_user_for_container_networking.html.

K N et al. "Day One: Contrail DPDK vROUTER," Juniper Networks, Inc., Jan. 7, 2021,196 pp.

Song et al., "Day One: Building Containers Using Kubernetes and Contrail," Juniper Networks, Inc., Nov. 2019, 283 pp.

U.S. Appl. No. 17/649,632, filed Feb. 1, 2022, naming inventors Akkipeddi et al.

Response to Extended Search Report dated Jul. 11, 2022, from counterpart European Application No. 22159178.7 filed Mar. 3, 2023, 32 pp.

Communication pursuant to Article 94(3) EPC from counterpart European Application No. 22159178.7 dated Feb. 1, 2024, 5 pp.

* cited by examiner

700

702

OBTAINING, BY AN ORCHESTRATOR, A POD SPECIFICATION FOR A POD, WHEREIN THE POD SPECIFICATION INCLUDES DATA FOR GENERATING SOCKET DESCRIPTION DATA THAT INDICATES A FILE SYSTEM RESOURCE TO BE USED BY THE POD, WHEN THE POD IS DEPLOYED TO A COMPUTING DEVICE, FOR CREATING A UNIX DOMAIN SOCKET THAT IS ACCESSIBLE BY THE POD AND NOT ACCESSIBLE BY ANY OTHER PODS DEPLOYED TO THE COMPUTING DEVICE

704

OUTPUTTING, BY THE ORCHESTRATOR, THE POD SPECIFICATION TO AN ORCHESTRATION AGENT EXECUTING ON THE COMPUTING DEVICE, WHEREIN THE ORCHESTRATION AGENT IS AN AGENT OF THE ORCHESTRATOR

FIG. 7

DATA INTERFACES WITH ISOLATION FOR CONTAINERS DEPLOYED TO COMPUTE NODES

This application claims the benefit of U.S. Provisional Patent Application No. 63/242,434, filed 9 Sep. 2021; India Provisional Patent Application No. 202141008464, filed 1 Mar. 2021; and India Provisional Patent Application No. 202141008548, filed 1 Mar. 2021; the entire content of each application is incorporated herein by reference.

TECHNICAL FIELD

The disclosure relates to a virtualized computing infrastructure and, more specifically, to deploying containers to virtualized computing infrastructure.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more anciently than VMs, and they can also be managed as groups of logically related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, techniques are described for deploying a logically-related group of one or more containers ("pod") that supports data plane-centric software frameworks, such as containers implemented using native applications of the Data Plane Development Kit (DPDK) (referred to herein as "DPDK containers" or "DPDK applications"), to enable packet communication on a data channel between a virtual router and the pod. In some examples, the virtual router is a DPDK-based virtual router such that packets sourced by or destined to the containers may be exchanged between the containers and the virtual router in user space, bypassing the kernel of a computing device hosting the pod and the virtual router.

A container network interface module or plugin (CNI) is a networking solution for application containers and is a runtime executable used by the container orchestration system to configure a network interface into a container network namespace and to configure the computing device ("host") hosting the container, which may be a member of a pod. The computing device may be alternatively referred to as a "compute node" or "server". The CNI further assigns the network address (e.g., address) to the network interface and may also add routes relevant for the interface, such as routes for the default gateway and one or more nameservers.

As described herein, a control flow for deploying a pod and configuring the pod and a virtual router within a compute node may include creating a high-speed data path between the pod and virtual router in a manner that isolates pods from one another. For example, DPDK containers may use a vhost/virtio library to create an ethernet interface for communications with the host machine or, more specifically, the virtual router. If the host machine provides a common file system resource for communications to multiple pods for communications with the virtual routers, any pod may have visibility and access to data exchanged between the other pods and the virtual router. Such data may include data packets, configuration files, or other sensitive information. To facilitate isolation, the host machine provides each pod with access to a separate, dedicated file system resource for communications between the virtual router and the pod. That is, each pod can use its assigned file system resource to communicate with the virtual router but does not have visibility or other access to similar file system resources assigned to other pods for this purpose. Each pod, using its assigned file system resource, can exchange control protocol messages with the virtual router to establish a high-speed data path between the virtual router and the pod for high throughput packet forwarding and processing. In some examples, the assigned file system resource is a socket file or directory for a Unix domain socket that operates as a control channel for creating and managing the high-speed data path. The high-speed data path may be an accelerated data path using DPDK.

The techniques may provide one or more technical advantages. For example, the techniques described herein may facilitate isolation among pods executing on a same compute node. Existing schemes for creating respective control channels between multiple pods of a compute node and the virtual router involve providing all of the pods with an identical socket directory path (e.g., /var/run/vrouter) as the folder to store the socket file, and each container then mounts the same socket directory path to access the socket file for binding an interface in user space to create its control channel with the virtual router for creating the high-speed data path. Consequently, each pod potentially has visibility into every other pod's control channel. The described techniques, by contrast, result in each pod having a different file system resource to support the control channel and prevents a pod from accessing the control channels of other pods, which could otherwise allow the pod to access configuration files or other control or management information for the other pods. As another example, in examples where the CNI obtains the pod identifier from the virtual router, by avoiding some communications from the CNI to the orchestration system, the techniques may reduce backlog on the orchestration system that may be caused by a large number of workloads being deployed concurrently to multiple different compute nodes.

In an example, a computing device comprises a virtual router comprising processing circuitry and configured to implement, in a computing infrastructure that includes the computing device, a virtual network to enable communications among virtual network endpoints connected via the virtual network. The computing devices comprises a pod comprising a containerized application, wherein the virtual router and the pod are configured to create a Unix domain socket using a file system resource that is accessible by the pod and by the virtual router and is not accessible by any other pods deployed to the computing device.

In an example, a method comprises obtaining, by an orchestrator, a pod specification for a pod, wherein the pod specification includes data for generating socket description data that indicates a file system resource to be used by the pod, when the pod is deployed to a computing device, for creating a Unix domain socket that is accessible by the pod and not accessible by any other pods deployed to the computing device; and outputting, by the orchestrator, the pod specification to an orchestration agent executing on the computing device, wherein the orchestration agent is an agent of the orchestrator.

In an example, a method comprises creating, by a virtual router and a pod executing on a computing device, a Unix domain socket using a socket directory that is accessible by the pod and by the virtual router and is not accessible by any other pods deployed to the computing device, a Unix domain socket; implementing, by the virtual router, in a computing infrastructure that includes the computing device, a virtual network to enable communications among virtual network endpoints connected via the virtual network; and exchanging, by the virtual router and the pod, using the Unix domain socket, control communications for a data plane development kit (DPDK) interface between the virtual router and the pod.

The details of one or more examples of this disclosure are set forth in the accompanying drawings and the description below. Other features, objects, and advantages will be apparent from the description and drawings, and from the claims.

BRIEF DESCRIPTION OF DRAWINGS

FIG. 7 is a flowchart illustrating an example mode of operation of an orchestrator, according to techniques described here.

Like reference characters denote like elements throughout the description and figures.

DETAILED DESCRIPTION

Figure 1:
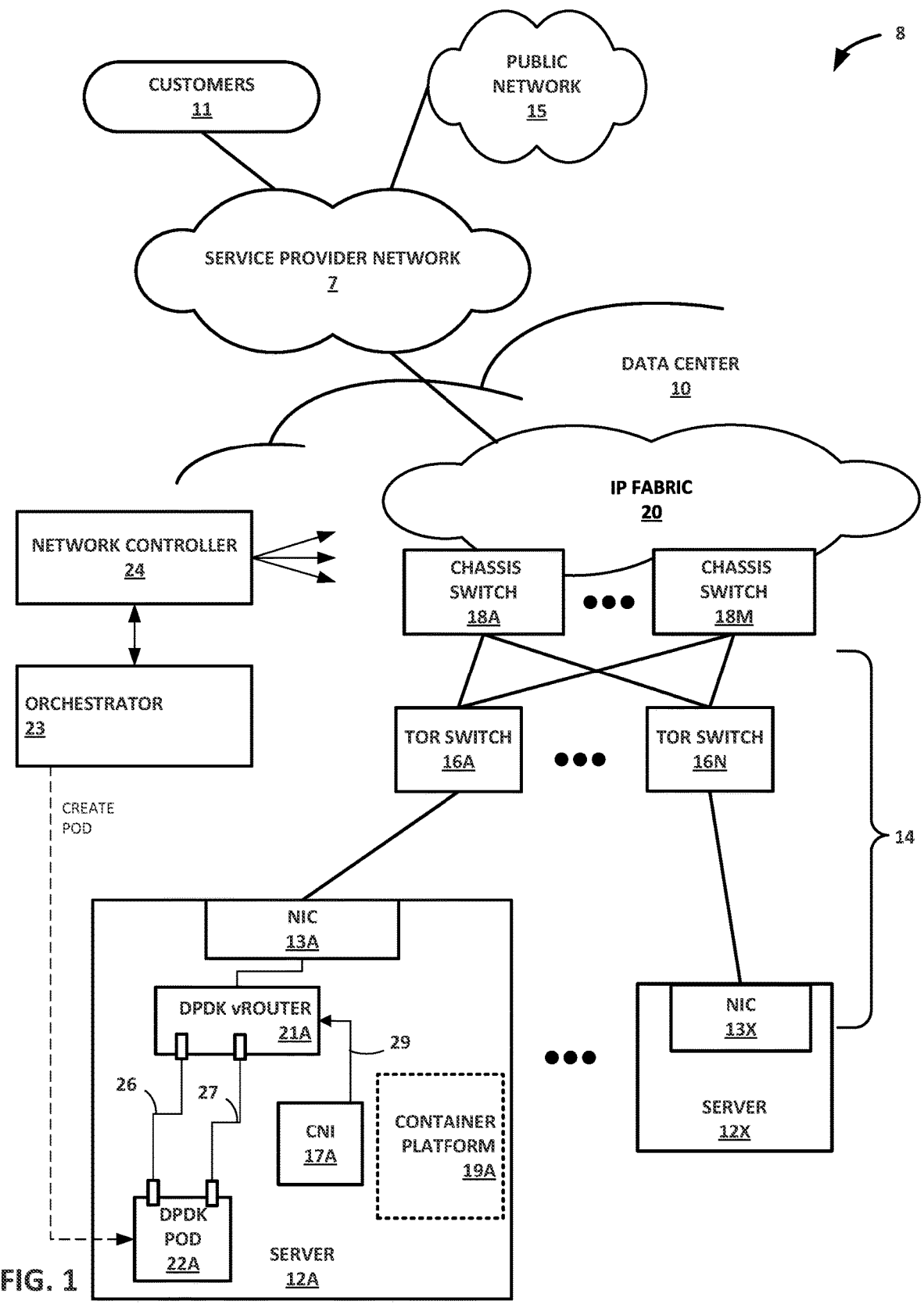
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. In general, data center 10 provides an operating environment for applications and services for customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers (or "nodes") interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "hosts" or "host devices." Although only server 12A coupled to TOR switch 16A is shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), mobile core network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance. IP fabric 20 may include one or more gateway routers.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to and extended across physical Multi-Protocol Label Switching (MPLS) Layer 3 Virtual Private Networks (L3VPNs) and Ethernet Virtual Private Networks (EVPNs) networks using a datacenter 10 gateway router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network, made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A, virtual routers running in servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not store any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e., which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and instead provide an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LSC), an operating-system-level virtualization method for running multiple isolated Linux systems (containers) on a control host using a single Linux kernel.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1, server 12A hosts one virtual network endpoint in the form of pod 22A having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with. TOR switches 16 over a communication link. For example, server 12A includes NIC 13A. Any of NICs 13 may provide one or more virtual hardware components 21 for virtualized input/output (I/O). A virtual hardware component for I/O maybe a virtualization of the physical NIC (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass a Contrail or Tungsten Fabric virtual router, Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 21A (illustrated as "DPDK vROUTER 21A") of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multi-protocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., pod 22A), the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints.

Virtual router 21A is a Data Plane Development Kit (DPDK)-enabled virtual router. That is, virtual router 21A uses DPDK as a data plane. In this mode, virtual router 21A runs as a user space application that is linked to the DPDK library (not shown). This is a performance version of a virtual router and is commonly used by telecommunications companies, where the VNFs are often DPDK-based applications. The performance of virtual router 21A as a DPDK virtual router can achieve ten times higher throughput than a virtual router operating as a kernel-based virtual router. The physical interface is used by DPDK's poll mode drivers (PMDs) instead of Linux kernel's interrupt-based drivers.

A user-I/O (UIO) kernel module, such as vfio or uio_pci_generic, may be used to expose a physical network interface's registers into user space so that they are accessible by the DPDK PMD. When NIC 13A is bound to a UIO driver, it is moved from Linux kernel space to user space and therefore no longer managed nor visible by the Linux OS. Consequently, it is the DPDK application (i.e., virtual router 21A in this example) that fully manages the NIC 13. This includes packets polling, packets processing, and packets forwarding. User packet processing steps may be performed by the virtual router 21A DPDK data plane with limited or no participation by the kernel (kernel not shown in FIG. 1). The nature of this "polling mode" makes the virtual router 21A DPDK data plane packet processing/forwarding much more efficient as compared to the interrupt mode, particularly when the packet rate is high. There are limited or no interrupts and context switching during packet I/O.

Additional details of an example of a DPDK vRouter are found in "DAY ONE: CONTRAIL DPDK vROUTER," 2021, Kiran K N et al., Juniper Networks, Inc., which is incorporated by reference herein in its entirety.

Computing infrastructure 8 implements an automation platform for automating deployment, scaling, and operations of virtual execution elements across servers 12 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 8 include at least servers 12, orchestrator 23, and network controller 24. Containers may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily container hosting devices of a cluster. For example, the Kubernetes platform uses the terms "cluster master" and "minion nodes," while the Docker Swarm platform refers to cluster managers and cluster nodes.

Orchestrator 23 and network controller 24 may execute on separate computing devices, execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12 (also referred to as "compute nodes").

In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226, 509, filed Mar. 26, 2014, and entitled "Tunneled Packet Aggregation for Virtual Networks," each which is incorporated by reference as if fully set forth herein.

In general, orchestrator 23 controls the deployment, scaling, and operations of containers across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform. Example components of a Kubernetes orchestration system are described below with respect to FIG. 3.

In one example, pod 22A is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22A is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19A for running containerized applications, such as those of pod 22A. Container platform 19A receives requests from orchestrator 23 to obtain and host, in server 12A, containers. Container platform 19A obtains and executes the containers.

Container platform 19A includes a container network interface (CNI) 17A that configures virtual network interfaces for virtual network endpoints. The orchestrator 23 and container platform 19A uses CNI 17A to manage networking for pods, including pod 22A. For example, the CNI 17A creates virtual network interfaces to connect pods to virtual router 21A and enable containers of such pods to communicate, via the virtual network interfaces, to other virtual network endpoints over the virtual networks. CNI 17A may, for example, insert a virtual network interface for a virtual network into the network namespace for containers in pod 22A and configure (or request to configure) the virtual network interface for the virtual network in virtual router 21A such that the virtual router 21A is configured to send packets received from the virtual network via the virtual network interface to containers of pod 22A and to send packets received via the virtual network interface from containers of pod 22A on the virtual network. CNI 17A may assign a network address (e.g., a virtual IP address for the virtual network) and may set up routes for the virtual network interface. In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network CNI 17A may represent a library, a plugin, a module, a runtime, or other executable code for server 12A. CNI 17A may conform, at least in part, to the Container Network Interface (CNI) specification or the rkt Networking Proposal. CNI 17A may represent a Contrail, OpenContrail, Multus, Calico, cRPD, or other CNI. CNI 17A may alternatively be referred to as a network plugin or CNI plugin or CNI instance. Separate CNIs may be invoked by, e.g., a Multus CNI to establish different virtual network interfaces for pod 202A.

CNI 17A is invoked by orchestrator 23. For purposes of the GNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks. The CNI specification specifies a number of considerations for a conforming plugin ("CNI plugin").

Pod 22A includes a containerized DPDK workload that is designed to use DPDK to accelerate packet processing, e.g., by exchanging data with other components using DPDK libraries.

Pod 22A is configured with management interface 26 that is used for management or control and is configured with a data interface 27 that is used for high-throughput packet processing, more specifically, for sending and receiving packets with virtual router 21A for high-throughput applications. Management interface 26 may be a default interface for pod 22A. Pod 22A may implement management interface 26 as an Ethernet interface (e.g., named "eth0") while virtual router 21A may implement management interface 26 as a tap interface, virtio-user interface, or other type of interface.

Figure 5:
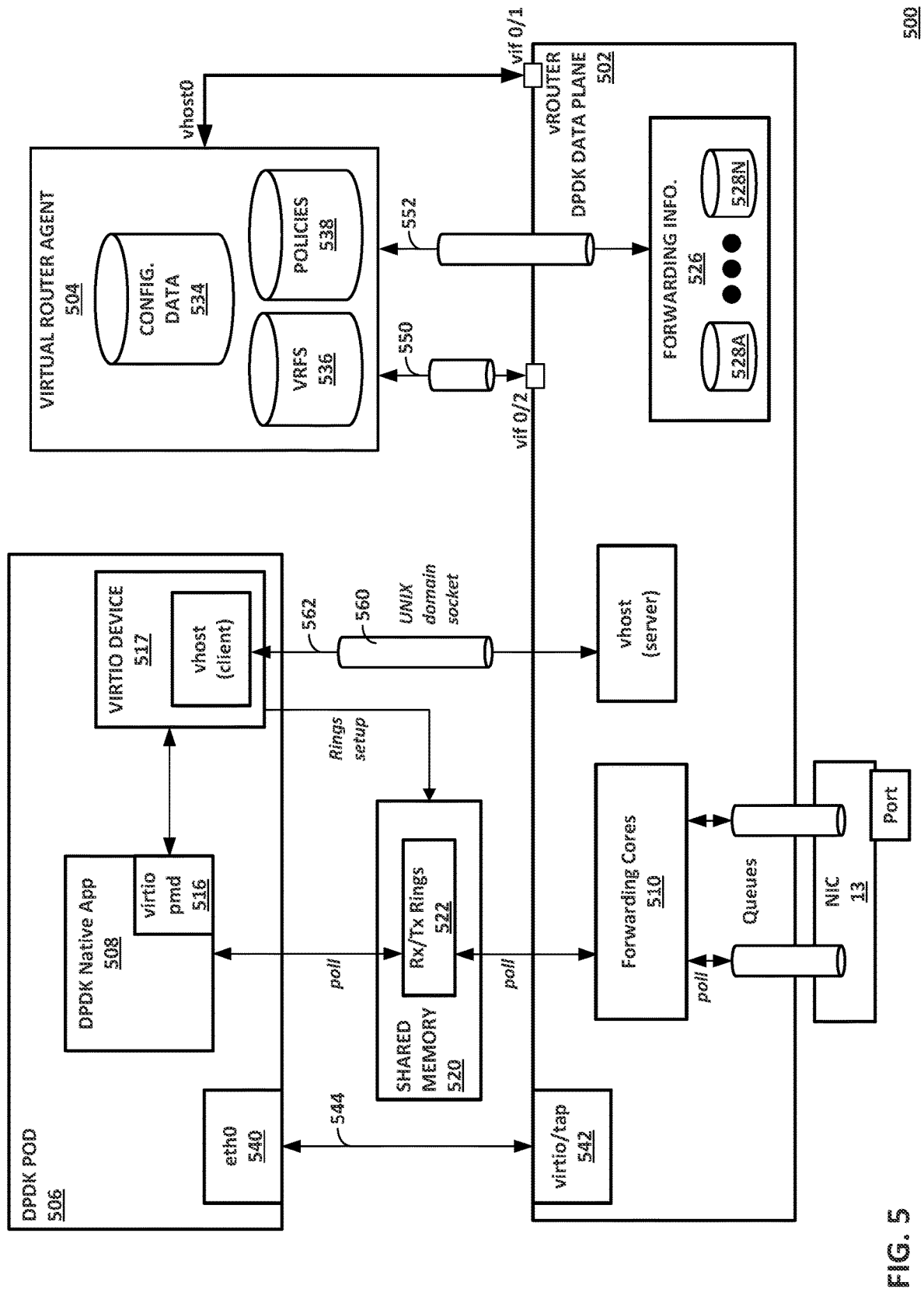
FIG. 5 is a block diagram illustrating an example computing device having a DPDK-based virtual router and a containerized DPDK workload, with interfaces established according to one or more aspects of this disclosure.

Pod 22A and virtual router 21A exchange data packets using data interface 27. Data interface 27 may be a DPDK interface. Pod 22A and virtual router 21A may set up data interface 27 using vhost. Pod 22A may operate according to an aggregation model. Pod 22A may use a virtual device, such as a virtio device with a vhost-user adapter, for user space container inter-process communication for data interface 27. An example is illustrated in FIG. 5, where virtio in this example may be a shared memory-based solution for exchanging packets with virtual router 21A. The shared memory may be huge pages initialized in DPDK and managed by the virtio device. The workload of pod 22A is thus built on DPDK and operates data interface 27 using DPDK. Pod 22A and virtual router 21A may bring up DPDK interfaces using vhost. Pod 22A may operate as a vhost server in some examples, with virtual router 21A as the vhost client, for setting up a DPDK interface. Virtual router 21A may operate as a vhost server in some examples, with pod 22 as the vhost client, for setting up a DPDK interface.

CNI 17A may configure, for pod 22A, in conjunction with one or more other components shown in FIG. 1, management interface 26 and data interface 27. As noted above, these may be different types of interfaces. Each of management interface 26 and data interface 27 may be referred to herein as virtual network interfaces. Other example types of virtual network interfaces are described below. Any of the containers of the pod 22A may utilize, i.e., share, any virtual network interface of pod 22A.

A virtual network interface may represent a virtual ethernet ("veth") pair, where each end of the pair is a separate device (e.g., a Linux/Unix device), with one end of the pair assigned to pod 22A and one end of the pair assigned to virtual router 21A. The veth pair or an end of a veth pair are sometimes referred to as "ports". A virtual network interface may represent a macvlan network with media access control (MAC) addresses assigned to the pod 22A and to the virtual router 21A for communications between containers of pod 22A and virtual router 21A. Virtual network interfaces may alternatively be referred to as virtual machine interfaces (VMIs), pod interfaces, container network interfaces, tap interfaces, veth interfaces, or simply network interfaces (in specific contexts), for instance.

In the example server 12A of FIG. 1, pod 22A is a virtual network endpoint in one or more virtual networks. Orchestrator 23 may store or otherwise manage configuration data for application deployments that specifies a virtual network and specifies that pod 22A (or the one or more containers therein) is a virtual network endpoint of the virtual network. Orchestrator 23 may receive the configuration data from a user, operator/administrator, or other machine system, for instance.

As part of the process of creating pod 22A, orchestrator 23 requests that network controller 24 create respective virtual network interfaces for the virtual networks (indicated in the configuration data). A pod 22A may have a different virtual network interface for each virtual network to which it belongs, as well as management interface 26. For example, data interface 27 may be a virtual network interface for a particular virtual network. Additional data interfaces may be configured for other virtual networks. Network controller 24 processes the request to generate interface configuration data for the virtual network interfaces for the pod 22A. Interface configuration data may include a container or pod unique identifier and a list or other data structure specifying, for each of the virtual network interfaces, network configuration data for configuring the virtual network interface. Network configuration data for a virtual network interface may include a network name, assigned virtual network address, MAC address, and/or domain name server values. An example of interface configuration data in JavaScript Object Notation (JSON) format is below. There may be separate interface configuration data for management interface 26 and data interface 27.

Network controller 24 sends interface configuration data to server 12A and, more specifically in some cases, to virtual router 21A. To configure a virtual network interface for pod 22A, orchestrator 23 may invoke CNI 17A. CNI 17A obtains the interface configuration data from virtual router 21A and processes it. CNI 17A creates each virtual network interface specified in the interface configuration data. For example, CNI 17A may attach one end of a veth pair implementing management interface 26 to virtual router 21A and may attach the other end of the same veth pair to pod 22A, which may implement it using virtio-user.

The following is example interface configuration data for pod 22A for the virtual network interface that is management interface 26.

```
[{
    // virtual network interface; management interface 26
    "id": "fe4bab62-a716-11e8-abd5-0cc47a698428",
    "instance-id": "fe3edca5-a716-11e8-822c-0cc47a698428",
    "ip-address": "10.47.255.250,
    "plen": 12,
```

-continued

```
        "vn-id": "56dda39c-5e99-4a28-855e-6ce378982888",
        "vm-project-id": "00000000-0000-0000-0000-000000000000",
        "mac-address": "02:fe:4b:ab:62:a7",
        "system-name": "tapeth0fe3edca",
        "rx-vlan-id": 65535,
        "tx-vlan-id": 65535,
        "vhostuser-mode": 0,
        "v6-ip-address": "::",
        "v6-plen": ,
        "v6-dns-server": "::",
        "v6-gateway": "::",
        "dns-server": "10.47.255.253",
        "gateway": "10,47,255.254",
        "author": "/usr/bin/contrail-vroute-agent",
        "time": "426404:56:19.863169"
    }]
```

A conventional CNI plugin is invoked by a container platform/runtime, receives an Add command from the container platform to add a container to a single virtual network, and such a plugin may subsequently be invoked to receive a Del(ete) command from the container/runtime and remove the container from the virtual network. The term "invoke" may refer to the instantiation, as executable code, of a software component or module in memory for execution by processing circuitry.

In accordance with techniques of this disclosure, a control flow for deploying pod 22A and configuring pod 22A may include creating a high-speed data path between pod 22A and virtual router 21A in a manner that isolates pod 22A from accessing the respective data interfaces between other pods deployed on server 12A and virtual router 21A (other pods not shown in FIG. 1). For example, pod 22A may use a vhost/virtio library to create an ethernet interface for communications with server 12A or, more specifically, virtual router 21A. To facilitate isolation among pods, server 12A provides pod 22A with access to a unique file system resource for communications between virtual router 21A and pod 22A. In the illustrated example, as part of the deployment of pod 22A and the creation of data interface 27, CNI 17A passes file system resource description data 29 to virtual router 21A. File system resource description data 29 may include a file name, directory having a directory path, a name, socket directory having a directory path, socket name, an identifier, or a combination of thereof. File system resource description data 29 describes a resource within the file system of server 12A, such as a file name and directory, that will be known to pod 22A but not to other pods deployed on server 12A. In some examples, to ensure uniqueness of the file system resource, the file system resource description data 29 is based on data that describes pod 22A, such as at least a portion (e.g., a substring) of a pod identifier (ID), unique identifier (UID) or universally unique identifier (UUID). Such information may be included in a pod manifest (e.g., pod.yaml) and passed to CNI 17A from orchestrator 23.

Based on the file system resource description data 29, virtual router 21A creates an inter-process communication (IPC) channel using the file system resource. The IPC channel may be a Unix domain socket, for instance, or another type of interface by which pod 22A and virtual router 21A may exchange control messages. Domain sockets use the file system as their address space. Processes reference a domain socket as an Mode, and multiple processes can communicate using a same socket. The server of the communication binds a UNIX socket to a path in the file system, so a client can connect to it using that path.

Pod 22A can use its assigned file system resource to communicate with the virtual router but does not have visibility or other access to similar file system resources assigned to other pods for this purpose. Pod 22A may use its assigned file system resource to exchange control protocol messages with virtual router 21A to configure data interface 27. Data interface 27 may include both a control channel that uses the assigned file system resource for the control messages and a DPDK channel that is a high-speed data path between virtual router 21A and pod 22A for high throughput packet forwarding and processing. In some examples, the control channel that uses the assigned file system resource is a separate virtual network interface, such as management interface 26. In some examples, the assigned file system resource is a socket file or directory for a Unix domain socket that operates as a control channel for creating and managing the high speed data path. The high speed data path may be an accelerated data path using DPDK.

Figure 2:
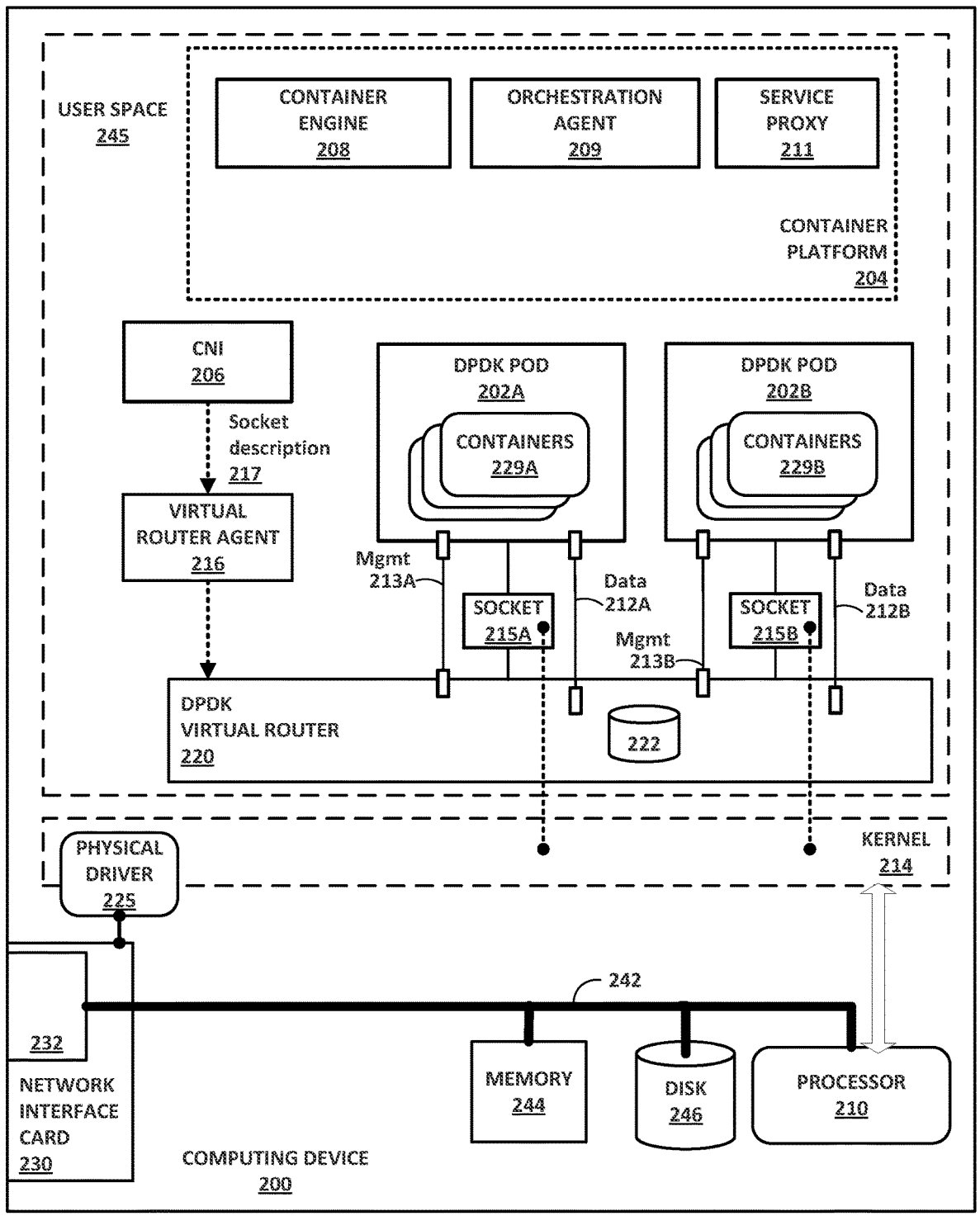
FIG. 2 is a block diagram of an example computing device that facilitates data channel isolation among pods, according to techniques described in this disclosure.

FIG. 2 is a block diagram of an example computing device that facilitates data channel isolation among pods, according to techniques described in this disclosure. Computing device 200 of FIG. 2 may represent a real or virtual server and may represent an example instance of any of servers 12 of FIG. 1. Computing device 200 includes in this example, a bus 242 coupling hardware components of a computing device 200 hardware environment. Bus 242 couples network interface card (NIC) 230, storage disk 246, and one or more hardware-based processors 210 (hereinafter, "processor 210"). NIC 230 may be SR-IOV-capable. A front-side bus may in some cases couple processor 210 and memory device 244. In some examples, bus 242 may couple memory device 244, processor 210, and NIC 230. Bus 242 may represent a Peripheral Component interface (PCI) express (PCIe) bus. In some examples, a direct memory access (DMA) controller may control DMA transfers among components coupled to bus 242. In some examples, components coupled to bus 242 control DMA transfers among components coupled to bus 242.

Processor 210 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 244 provides a physical address space composed of addressable memory locations.

Network interface card (NIC) 230 includes one or more physical interfaces 232 configured to exchange packets using links of an underlying physical network. Interfaces 232 may include a port interface card having one or more network ports. NIC 230 may also include an on-card memory to, e.g., store packet data. Direct memory access transfers between the NIC 230 and other devices coupled to bus 242 may read/write from/to the NIC memory.

Memory 244, NIC 230, storage disk 246, and processor 210 may provide an operating environment for a software stack that includes an operating system kernel 214 executing in kernel space. Kernel 214 may represent, for example, a Linux, Berkeley Software Distribution (BSD), another Unix-variant kernel, or a Windows server operating system kernel, available from Microsoft Corp. In some examples, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 214 provides an execution environment for one or more processes in user space 245.

Kernel 214 includes a physical driver 225 to use the network interface card 230. Network interface card 230 may also implement SR-IOV to enable sharing the physical network function (I/O) among one or more virtual execution elements, such as containers 229A and 229B or one or more virtual machines (not shown in FIG. 2). Shared virtual devices such as virtual functions may provide dedicated resources such that each of the virtual execution elements may access dedicated resources of NIC 230, which therefore appears to each of the virtual execution elements as a dedicated NIC. Virtual functions may represent lightweight PCIe functions that share physical resources with a physical function used by physical driver 225 and with other virtual functions. For an SR-IOV-capable NIC 230, NIC 230 may have thousands of available virtual functions according to the SR-IOV standard, but for I/O-intensive applications the number of configured virtual functions is typically much smaller.

Computing device 200 may be coupled to a physical network switch fabric that includes an overlay network that extends switch fabric from physical switches to software or "virtual" routers of physical servers coupled to the switch fabric, including DPDK-based virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Virtual router 220 can be executing as a kernel module or as a user space DPDK process (virtual router 220 is shown here in user space 245). Virtual router agent 216 may also be executing in user space. In the example computing device 200 of FIG. 2, virtual router 220 executes within user space as a DPDK-based virtual router, but virtual router 220 may execute within a hypervisor, a host operating system, a host application, or a virtual machine in various implementations. Virtual router agent 216 has a connection to network controller 24 using a channel, which is used to download configurations and forwarding information. Virtual router agent 216 programs this forwarding state to the virtual router data (or "forwarding") plane represented by virtual router 220. Virtual router 220 and virtual router agent 216 may be processes.

Virtual router 220 may replace and subsume the virtual routing/bridging functionality of the Linux bridge/OVS module that is commonly used for Kubernetes deployments of pods 202. Virtual router 220 may perform bridging (e.g., E-VPN) and routing (e.g., L3VPN, IP-VPNs) for virtual networks. Virtual router 220 may perform networking services such as applying security policies, NAT, multicast, mirroring, and load balancing.

Virtual router 220 may be multi-threaded and execute on one or more processor cores. Virtual router 220 may include multiple queues. Virtual router 220 may implement a packet processing pipeline. The pipeline can be stitched by the virtual router agent 216 from the simplest to the most complicated manner depending on the operations to be applied to a packet. Virtual router 220 may maintain multiple instances of forwarding bases. Virtual router 220 may access and update tables using RCU (Read Copy Update) locks.

To send packets to other compute nodes or switches, virtual router 220 (data plane) uses one or more physical interfaces 232. In general, virtual router 220 exchanges overlay packets with workloads, such as VMs or pods 202 (in FIG. 2). Virtual router 220 is configured with multiple virtual router network interfaces (e.g., vifs). These interfaces may include an interface to the underlay NIC 230 (vif 0/0)—a Linux bond interface in some examples; a kernel interface, vhost0 (or vif 0/2), for exchanging packets with the host operating system; an interface with virtual router agent 216, pkt0 (or vif 0/2), to obtain forwarding state from the network controller and to send up exception packets. Additional virtual router network interfaces are for communications with virtual execution elements, such as DPDK pods 202A-202B (collectively, "pods 202"). Virtual router network interfaces may be alternatively referred to as virtual network interfaces in some contexts described in this disclosure, in that virtual network interfaces for the virtual execution elements, including pods or other workloads are implemented in part using virtual router network interfaces.

Virtual network interfaces 212A-212B (collectively, "virtual network interfaces 212") and 213A-213B (collectively, "virtual network interfaces 213") of virtual router 220 are illustrated in FIG. 2. Each of virtual network interfaces 212, 213 may be a tap interface, DPDK interface, Unix domain socket, virtio interface, veth interface, macvlan, another type of interface, or a combination of types of interfaces.

In a kernel-based deployment of virtual router 220 (not shown), virtual router 220 is installed as a kernel module inside the operating system. Virtual router 220 registers itself with the TCP/IP stack to receive packets from any of the desired operating system interfaces that it wants to. The interfaces can be bond, physical, tap (for VMs), veth (for containers), etc. Virtual router 220 in this kernel mode relies on the operating system to send and receive packets from different interfaces. For example, the operating system may expose a tap interface backed by a vhost-net driver to communicate with workloads. Once virtual router 220 registers for packets from this tap interface, the TCP/IP stack sends all the packets to it. Virtual router 220 sends packets via an operating system interface. In addition, NIC queues (physical or virtual) are handled by the operating system. Packet processing may operate in interrupt mode, which generates interrupts and may lead to frequent context switching. When there is a high packet rate, the overhead attendant with frequent interrupts and context switching may overwhelm the operating system and lead to poor performance.

In a DPDK-based deployment of virtual router 220 (shown in FIG. 2), virtual router 220 is installed as a user space 245 application that is linked to the DPDK library. This may lead to faster performance than a kernel-based deployment, particularly in the presence of high packet rates. The physical interfaces 232 are used by the poll mode drivers (PMDs) of DPDK rather than the kernel's interrupt-based drivers. The registers of physical interfaces 232 may be exposed into user space 245 in order to be accessible to the PMDs; a physical interface 232 bound in this way is no longer managed by or visible to the host operating system, and the DPDK-based virtual router 220 manages the physical interface 232. This includes packet polling, packet processing, and packet forwarding. In other words, user packet processing steps are performed by the virtual router 220 DPDK data plane. The nature of this "polling mode" makes the virtual router 220 DPDK data plane packet processing/forwarding much more efficient as compared to the interrupt mode when the packet rate is high. There are comparatively few interrupts and context switching during packet I/O, compared to kernel-mode virtual router 220, and interrupt and context switching during packet I/O may in some cases be avoided altogether.

Pods 202 are DPDK-based pods. In general, each of pods 202A-202B may be assigned one or more virtual network addresses for use within respective virtual networks, where each of the virtual networks may be associated with a different virtual subnet provided by virtual router 220. Pod 202B may be assigned its own virtual layer three (L3) IP address, for example, for sending and receiving communications but may be unaware of a host IP address of the computing device 200 on which the pod 202B. The virtual network address may thus differ from the logical address for the underlying, physical computer system, e.g., computing device 200.

Computing device 200 includes a virtual router agent 216 that controls the overlay of virtual networks for computing device 200 and that coordinates the routing of data packets within computing device 200. In general, virtual router agent 216 communicates with network controller 24 (FIG. 1) for the virtualization infrastructure, which generates commands to create virtual networks and configure network virtualization endpoints, such as computing device 200 and, more specifically, virtual router 220, as well as any of virtual network interfaces 212, 213. By configuring virtual router 220 based on information received from network controller 24, virtual router agent 216 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 229A-229B within the virtual network domains may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220. This functionality is referred to herein as tunneling and may be used to create one or more overlay networks. Besides IPinIP, other example tunneling protocols that may be used include IP over Genetic Route Encapsulation (GRE), VxLAN, Multiprotocol Label Switching (WES) over GRE, MPLS over User Datagram Protocol (UDP), etc. Virtual router 220 performs tunnel encapsulation/decapsulation for packets sourced by/destined to any containers of pods 202, and virtual router 220 exchanges packets with pods 202 via bus 242 and/or a bridge of NIC 230.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 220 implements one or more virtual routing and forwarding instances (VRFs) 222 for respective virtual networks for which virtual router 220 operates as respective tunnel endpoints. In general, each of VRFs 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of VRFs 222 may include a network forwarding table storing routing and forwarding information for the virtual network.

NIC 230 may receive tunnel packets. Virtual router 220 processes the tunnel packet to determine, from the tunnel encapsulation header, the virtual network of the source and destination endpoints for the inner packet. Virtual router 220 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to one of VRFs 222. The VRF may include forwarding information for the inner packet. For instance, the VRF may map a destination layer 3 (L3) address for the inner packet to virtual network interface 212. The VRF forwards the inner packet via virtual network interface 212 to POD 202A in response.

Containers 229A 229B may also source inner packets as source virtual network endpoints. Container 229A, for instance, may generate a layer 3 inner packet destined for a destination virtual network endpoint that is executed by another computing device (i.e., not computing device 200) or for another one of containers 229A-229B. Container 229A sends the layer 3 inner packet to virtual router 220 via virtual network interface 212.

Virtual router 220 receives the inner packet and layer 2 header and determines a virtual network for the inner packet. Virtual router 220 may determine the virtual network using any of the above-described virtual network interface implementation techniques (e.g., macvlan, veth, etc.). Virtual router 220 uses the VRF 222A corresponding to the virtual network for the inner packet to generate an outer header for the inner packet, the outer header including an outer IP header for the overlay tunnel and a tunnel encapsulation header identifying the virtual network. Virtual router 220 encapsulates the inner packet with the outer header. Virtual router 220 may encapsulate the tunnel packet with a new layer 2 header having a destination layer 2 (L2) address associated with a device external to the computing device 200, e.g., a TOR switch 16 or one of servers 12. If external to computing device 200, virtual router 220 outputs the tunnel packet with the new layer 2 header to NIC 230 using physical function 221. NIC 230 outputs the packet on an outbound interface. If the destination is another virtual network endpoint executing on computing device 200, virtual router 220 routes the packet to the appropriate one of virtual network interfaces 212, 213.

In some examples, a controller for computing device 200 (e.g., network controller 24 of FIG. 1) configures a default route in each of pods 202 to cause the pods to use virtual router 220 as an initial next hop for outbound packets. In some examples, NIC 230 is configured with one or more forwarding rules to cause all packets received from the pods to be switched to virtual router 220.

Pods 202A-202B may represent example instances of pod 22A of FIG. 1, in further detail. Pod 202A includes one or more containers 229A, and pod 202B includes one or more containers 229B.

Container platform 204 may represent an example instance of container platform 19A of FIG. 1, in further detail. Container platform 204 include container engine (or "runtime") 208, orchestration agent 209, service proxy 211. CNI 206 may represent an example instance of CNI 17A of FIG. 1.

Container engine 208 includes code executable by processor 210. Container runtime 208 may be one or more computer processes. Container engine 208 runs containerized applications in the form of containers 229A-229B. Container engine 208 may represent a Dockert, rkt, or other container engine for managing containers. In general, container engine 208 receives requests and manages objects such as images, containers, networks, and volumes. An image is a template with instructions for creating a container. A container is an executable instance of an image. Based on directives from orchestration agent 209, container engine 208 may obtain images and instantiate them as executable containers 229A-229B in pods 202A-202B.

Service proxy 211 includes code executable by processor 210. Service proxy 211 may be one or more computer processes. Service proxy 211 monitors for the addition and removal of service and endpoints objects, and it maintains the network configuration of the computing device 200 to ensure communication among pods and containers, e.g., using services. Service proxy 211 may also manage iptables to capture traffic to a service's virtual IP address and port and redirect the traffic to the proxy port that proxies a backed pod. Service proxy 211 may represent a kube-proxy for a minion node of a Kubernetes cluster. In some examples, container platform 204 does not include a service proxy 211 or the service proxy 211 is disabled in favor of configuration of virtual router 220 and pods 202 by CNIs 206.

Orchestration agent 209 includes code executable by processor 210. Orchestration agent 209 may be one or more computer processes. Orchestration agent 209 may represent a kubelet for a minion node of a Kubernetes cluster. Orchestration agent 209 is an agent of an orchestrator, e.g., orchestrator 23 of FIG. 1, that receives container specification data for containers and ensures the containers execute by computing device 200. Container specification data may be in the form of a manifest file sent to orchestration agent 209 from orchestrator 23 or indirectly received via a command line interface, HTTP endpoint, or HTTP server. Container specification data may be a pod specification (e.g., a PodSpec—a YAML (Yet Another Markup Language) or JSON object that describes a pod) for one of pods 202 of containers 229. Based on the container specification data, orchestration agent 209 directs container engine 208 to obtain and instantiate the container images for containers 229, for execution of containers 229 by computing device 200.

Orchestration agent 209 instantiates CNI 206 to configure one or more virtual network interfaces for each of pods 202. CNI 206 may represent an example instance of CNI 17A of FIG. 1. For example, orchestration agent 209 receives a container specification data for pod 202A and directs container engine 208 to create the pod 202A with containers 229A based on the container specification data for pod 202A. Orchestration agent 209 also invokes the CNI 206 to configure, for pod 202A, virtual network interface 212A for a virtual network corresponding to one of VRFs 222. Any of virtual network interfaces 213A-213B may represent an example instance of management interface 26 described in FIG. 1, and any of data interfaces 212A-212B may represent an example instance of data interface 27 described in FIG. 1. Management virtual network interfaces 213A-213B may be attached to a different VRF (or respective different VRFs) than the VRF(s) any of data virtual network interfaces 212A-212B.

CNI 206 may obtain interface configuration data for configuring virtual network interfaces for pods 202. Virtual router agent 216 operates as a virtual network control plane module for enabling network controller 24 to configure virtual router 220. Unlike the orchestration control plane (including the container platforms 204 for minion nodes and the master node(s), e.g., orchestrator 23), which manages the provisioning, scheduling, and managing virtual execution elements, a virtual network control plane (including network controller 24 and virtual router agent 216 for minion nodes) manages the configuration of virtual networks implemented in the data plane in part by virtual routers 220 of the minion nodes. Virtual router agent 216 communicates, to CNI 206, interface configuration data for virtual network interfaces to enable an orchestration control plane element (i.e., CNI 206) to configure the virtual network interfaces according to the configuration state determined by the network controller 24, thus bridging the gap between the orchestration control plane and virtual network control plane. In addition, this may enable a CNI 206 to obtain interface configuration data for multiple virtual network interfaces for a pod and configure the multiple virtual network interfaces.

In accordance with techniques described in this disclosure, CNI 206 provides virtual router agent 216 with socket description data 217 that facilitates file system isolation among pods 202. For example, to configure data interface 212A between virtual router 220 and pod 202A, CNI 206 obtains socket description data 217 that specifies a directory and socket name for a Unix domain socket. Based on socket description data 217, virtual router 220 and DPDK pod 202A create Unix domain socket 215A, which may operate as a control channel for data interface 212A. Unix domain socket 215A is created with a socket directory that is based on the directory specified by socket description data 217, and Unix domain socket 215A is named and referred to using the socket name specified by socket description data 217. Using socket 215A, virtual router 220 and pod 202A exchange control messages to negotiate DPDK rings over shared memory for a DPDK-based data interface 212A. Put another way, once the communication channel of socket 215A is established, the user space vhost protocol takes place. During this protocol message exchange, pod 202A and virtual router 220 exchange information about the pod's memory regions, virtio ring addresses, and the supported features. At the end of the message exchange, the virtio ring is enabled and data communication between pod 202A and virtual router 220 can occur.

CNI 206 may support IPv6 IPv4, non-DPDK interfaces, DPDK interfaces, configuring virtual network interfaces for DPDK-based virtual routers, and/or configuring virtual network interfaces for kernel-based virtual routers. CNI 206 may validate user inputs, such as socket description data found in pod manifests. If the indicated vhost mode for the DPDK app is not compatible with the vhost mode for virtual router 220, CNI 206 may return an error.

Example techniques for generating the socket directory path are described elsewhere in this disclosure. Similar operations may be performed by CNI 206, virtual router agent 216, virtual router 220, and pod 202B for creating socket 215B and data interface 212B.

The socket directory specified by socket description data 217 may be unknown and/or inaccessible to pod 202B or any other pods deployed to computing device 200 (not shown in FIG. 2), other than the pod (if any) that includes virtual socket description data, pods 202 do not have access and/or awareness of one another's data interfaces 212A and 212B.

An example call flow with operations by CNI 206 and virtual router agent 216 is as follows:

A network controller manager (e.g., network controller manager 325 of FIG. 3) listens to pod creation/deletion/update events for orchestrator 23. On detecting a new pod creation event, the network controller manager parses the pod information and creates corresponding interface configuration data for each virtual network interface to be configured for pod 202A. The network controller manager passes this interface configuration data to virtual router agent 216, optionally via network controller 24 having an interface with virtual router agent 216 to manage virtual routing in computing device 200.

In parallel to the above communications to virtual router agent 216 of interface configuration data, orchestration agent 209 obtains a "setup pod" event generated by orchestrator 23 for deploying pod 202A to computing device 200. As part of deploying pod 202A, orchestration agent 209 invokes CNI 206 to configure the networking for pod 202A. CNI 206, in turn, obtains from virtual router agent 216 a list of virtual network interfaces for pod 202A along with the interface configuration data. In some examples, CNI 206 calls a GET POD_CONFIG method of a virtual router agent 216 interface. Below is an example of interface configuration data for virtual network interface 212A for pod 202A:

```
{
    "id": "b3c9f4c6-340f-11eb-bff3-3cecef21ff36", // identifies the virtual network interface
    "vm-uuid": "4f8ab6d8-7675-4146-9453-51003115c236a", // identifies pod 202A
    "vn-id": "0f7e6d2b-02c3-44d2-87b1-33d591ef43f1", // identifies the virtual network
    "vn-name": "default-domain:k8s-default:k8s-network-a-pod-network",
    "mac-address": "02:b3:c9f4:c6:34",
    "sub-interface": false,
    "vlan-id": 65535,
    "annotations": [
        "{cluster:k8s}", "{index:1/2}", "{kind:Pod}","{name:testpind-pod}",
        "{namespace:default}","{network:network-a}","{owner:k8s}","{project:k8s-default}"
    ]
}
``` router 220. The socket directory specified by socket description data 217 may be different than the socket directory specified by corresponding socket description data for creating data interface 212B. Because sockets 215A and socket 215B use different socket directories, having been created using different specified socket directories in respective CNI 206 processes the interface configuration data and requests virtual router agent 216A to configure the virtual network interface to virtual router 220. For example, CNI 206 may invoke a port add message (e.g., POST VMI) of a virtual router agent 216 API. Below are example parameters for a request message from CNI 206 to virtual router agent 216A to configure the virtual network interface:

```
{
"time": "2020-12-02 01:29:22.90471852" +0530 IST m=+0.003573525",
    "vm-id":
"dbe77bab62ffcb566d4d6016f2feb167080c77bdcca7a28ac9b011d2638d25d0",
    "vm-uuid": "4f8ab6d8-7675-4146-9453-5100315c236a",
    "vm-name": "k8s__default__testpmd-pod",
    "host-ifname": "vhostnet1-dbe77bab62ff",
    "vm-ifname": "net1",
    "vm-namespace": "/proc/196482/ns/net",
    "vn-uuid": "0f7e6d2b-02c3-44d2-87b1-33d591ef43f1",
    "vmi-uuid": "b3c9f4c6-340f-11eb-bff3-3cecef21ff36",
    "vhostuser-mode": "client",
    "vhostsocket-dir": "/var/run/vrouter/4f8ab6d8-7675-4146-9453-5100315c236a/",
    "vhostsocket-filename": "dbe77bab62ff-net1"
}
```

The request message includes additional parameters for socket description data 217. That is, socket description data 217 in this example includes the vhostsocket-dir and vhost-socket-filename parameters (shown in bold). The vhost-socket-dir is the socket directory to be used for socket 215A. In this example, the value for vhostsocket-dir is a path based on /var/run/vrouter that is a base folder for the vrouter, along with the unique value for the folder within /var/ran/vrouter. In this case, the unique value is based on the unique identifier for pod 202A that was included in the interface configuration data for virtual network interface 212A for pod 202A. The pod identifier may a container identifier in some examples. As a result, pod 202B will not have access or visibility into this directory and pods 202 are isolated from one another's data interfaces 212. The vhostsocket-filename parameter value is in this case also based on an identifier for pod 202A (the vm-id) and a name for the interface ("net1"). The vhostsocket-filename may be used as the socket 215A socket name. This parameterization of these values, as generated by CNI 206 and provided to virtual router agent 216, differs from existing schemes in which the socket directory is fixed and the socket name is automatically derived by virtual router agent 216 based on the virtual network interface name or identifier.

Virtual router agent 216 processes the request message, and virtual router 220 and virtual router agent 216 use the information to configure data interface 212A for pod 202A. If in vhost server mode, virtual router 220 listens on the socket directory for socket 215A. If in client mode, virtual router 220 initiates communication on the socket directory for socket 215A. Virtual router 220 and pod 202A exchange control messages, which may conform to the vhost protocol, to negotiate DPDK rings over shared memory for a DPDK-based data interface 212A. In this way, virtual router 220 is configured with the virtual router end of data interface 212A that is a DPDK data path between virtual router 220 and pod 202A for high-speed packet processing and forwarding. Virtual router agent 216 also configures data interface 212A with network information, such as MAC and IP addresses, any needed VLANs, DNS and gateway information, MTUs, and in some cases other interface data, such as the interface name/id. Virtual router agent 216 may obtain at least some of this network information for configuring data interface 212A from network controller 24. Whether virtual router 220 is in client mode or server mode for the control protocol over socket 215A may be specified in the request message from CNI 206 to virtual router agent 216A. In the example above, this parameter is vhostuser-mode (shown in bold).

CNI 206 in turn obtains this network information about the data interface 212A from virtual router agent 216. For example, CNI 206 may call a GET VM_IP method of a virtual router agent 216 API to request the network information. Below is an example of network information about data interface 212A:

```
{
    "id": "b3c9f4c6-340f-11eb-bff3-3cecef21ff36",
    "instance-id": "4f8ab6d8-7675-4146-9453-5100315c236a",
    "vn-id": "0f7e6d2b-02c3-44d2-87b1-33d591ef43f1",
    "vm-project-id": "00000000-0000-0000-0000-000000000000",
    "mac-address": "02:b3:c9:f4:c6:34",
    "system-name": "vhostnet1-dbe77bab62ff",
    "rx-vlan-id": 65535,
    "tx-vlan-id": 65535,
    "vhostuser-mode": "server",
    "ip-address": "10.1.1.252",
    "plen": 24,
    "dns-server": "10.1.1.253",
    "gateway": "10.1.1,254",
    "author": "/path/contrail-vrouter-agent", // alternatively, /user/bin/contrail-vrouter-agent
    "time": "446347:59:37.906672"
}
```

CNI 206 may report at least some of the network information to orchestrator 23 via orchestration agent 209. CNI 206 provides or configures pod 202A with at least some of the network information in order that containers 229A of pod 202A may use data interface 212A as a virtual network interface. Such network information may include the MAC and IP address and the interface name. CNI 206 also provides pod 202A with the socket description data for socket 215A, e.g., the socket directory and socket name. These may be the same values as those provided by CNI 206 to virtual router agent 216A for the socket description data. CNI 206 may also provide pod 202A with an interface name and/or network configuration data for data interface 212A, such as an IP address, MAC address, DNS data, MTU, etc. This information and socket description data may be made available to pod 202A via a configuration file in a volume mount via the hostPath directory or via annotations mounted via downward APIs.

Alternatively, pod 202A may derive some or all of the socket description data rather than it being provided by CNI 206. For example, pod 202A may derive the socket name for socket 215A based on a container identifier for one of containers 229A, an interface name or interface identifier for the data interface 212A, a pod identifier or unique identifier, a namespace, annotation, label, or a combination of any of the two or more of the above. An example script for deriving a socket name as the first 12 characters of a container identifier and the interface name is:

```
IFNAME=net1
CONTAINERID=$(sed -ne '/hostname/p'
/proc/1/task/1/mountinfo | awk -F '/' '{print $6}')
SOCKNAME=$ [CONTAINERID:0:12]-$IFNAME
```

Containerized applications running inside of pods can use app-netutils APIs to query network information and configurations associated with pods.

In some examples, computing device 200 and orchestrator 23 may use mutating webhooks to provide socket description data for creating socket 215A. For instance, the components may implement an http callback with an API provided by kubernetes. The components may use a mutating admission webhook if it is intended to modify the resource object. Actions taken can be either modified or rejected for this type of webhook. Alternatively, the components may use a validating admission webhook if intended to enforce custom policies. Actions taken can be either accepted or rejected for this type or webhook, and no modification is allowed. The webhook is register with the API server 320 with rules, for an example rule: on a pod create. On an event, if there is a match to rules registered, API server 320 will initiate a call to the webhook defined and pass the resource object to defined handler function. Action on the kubernetes resource object will be taken as the webhook type used.

In case of a mutating admission webhook and a validating admission webhook, these may be registered for the same rule. The mutating admission webhook is called first, and then on success, API server 320 may call the validating admission webhook to make a final decision to accept or reject the request.

Advantages of using a webhook are that it may simplify the definitions that the user needs to do by defining a Label to classify all workloads deployed under DPDK category. This may be an add on for users who want to define a label in order that the volume and volume mount can be injected by the webhook in the pod definition (i.e., pod specification Another advantage may be reduced errors ensuring that volume mounts in containers associated with the volume defined with hostPath "/var/run/vrouter" have a subpath with POD_UID and environment variables used in subPathExpr are available. A configuration map can control functions of webhook, such as to enable/disable validation or mutation or specifying user-defined default parameters. If the pod is rescheduled to a different node or is deleted, the socket file and unique folder stays in the host. Therefore, it is important to listen to Pod delete events to take appropriate action to clean up the directory and socket files. CRUD operation on annotations can be defined here. New annotations can be added, modified, or deleted, if required for specific functionality, and custom warning messages may be added to indicate reasons for rejection.

Pod 202A (or more specifically, in some case, a DPDK application or library executing as part of pod 202A) establishes the socket based on the socket description data. If in vhost server mode, pod 202A listens on the socket directory for socket 215A. If in client mode, pod 202A initiates communication on the socket directory for socket 215A. Whether pod 202A is in vhost server or client mode may be specified by CNI 206, as with the vhostuser-mode parameter in the above example (shown in bold). Virtual router 220 and pod 202A exchange control messages, which may conform to the vhost protocol, to negotiate DPDK rings over shared memory for a DPDK-based data interface 212A. In this way, pod 202A is configured with the workload/pod end of data interface 212A that is a DPDK data path between virtual router 220 and pod 202A for high-speed packet processing and forwarding. Data interface 212A having been established, virtual router 220 may process and forward network packets for the virtual network that are sourced by pod 202A or destined for pod 202A.

A similar call flow may be performed by CNI 206, virtual router agent 216, virtual router 220 and pod 202B to create data interface 212B using socket 215B. As a result, pods 202 have separate DPDK interfaces established using separate, and mutually inaccessible to one another, socket-based control channels. Additional example details, implementations, and alternative implementations for the above functionality for configuring data interfaces using socket description data are described below.

In some examples, CNI 206 obtains socket description data from orchestrator 23, rather than via orchestration agent 209. CNI 206 may parse the pod manifest that indicates the socket directory and/or socket name to use for socket 215A (described elsewhere in this disclosure). In some examples, virtual router agent 216 may obtain interface configuration data from a routing protocol process executing on computing device. Example details of a virtual router agent 216 communicating with a routing protocol process (e.g., a containerized routing protocol daemon) are described in U.S. patent application Ser. No. 17/649,632, filed Feb. 1, 2022 and titled "Containerized Router with Virtual Networking," which is incorporated by reference herein in its entirety. In such examples, CNI 206 may be tailored to the routing protocol process. CNI 206 may communicate the socket description data 217 to virtual router agent via a REST interface, for instance. The routing protocol process may add a VRF, update the virtual network interface, route target, and next hop. Similar to as described elsewhere, virtual router agent 216 adds the data interface 212A to virtual router 220 and includes the socket directory and socket name for socket 215A establish a vhost control channel to negotiate and establish a vhost datapath (or DPDK datapath).

Pods 202 may be created and deployed with a modified workflow that generated containers that have DPDK capabilities. Below is example script for creating a DPDK pod image. This script is a Dockerfile, but other tools may be used:

```
FROM centos:7
ENV DPDK_VERSION=19.11.3
ENV DPDK_TARGET=x86_64-native-linuxapp-gcc
ENV DPDK_DIR=/usr/src/dpdk-stable-${DPDK_VERSION}
RUN yum groupinstall -y 'Development Tools'
RUN yum install -y wget numactl-devel
RUN cd /usr/src/ && \
  wget http://fast.dpdk.org/rel/dpdk-${DPDK_VERSION}.tar.xz && \
  tar xf dpdk-${DPDK_VERSION}.tar.xz && \
  rm -f dpdk-${DPDK_VERSION}.tar.xz && \
  cd ${DPDK_DIR} && \
  sed -i s/CONFIG_RTE_EAL_IGB_UIO=y/CONFIG_RTE_EAL_IGB_UIO=n/ config/common_linux && \
  sed -i s/CONFIG_RTE_LIBRTE_KNI=y/CONFIG_RTE_LIBRTE_KNI=n/ config/common_linux && \
  sed -i s/CONFIG_RTE_KNI_KMOD=y/CONFIG_RTE_KNI_KMOD=n/ config/common_linux && \
   make install T=${DPDK_TARGET} DESTDIR=install
```

In accordance with techniques of this disclosure, socket description data 217 may be based on data provided by orchestrator 23. For example, a pod manifest for pod 202A may indicate a socket directory for socket 215A using a string, which may include a variable for, e.g., a unique string that differentiates the socket directory for socket 215A from other sockets configured on computing device 200. An example pod manifest ('pod.yaml') for pod 202A is below:

```
api Version: v1
kind: Pod
metadata:
  name: client-pod
  generateName: client-pod
spec:
  containers:
  - name: client-pod
    image: dpdk-testpmd-app
    imagePullPolicy: Never
    securityContext:
      privileged: true
      command: ["tail", "-f", "/dev/null"]
    resources:
      requests:
        memory: 512Mi
      limits:
        hugepages-2Mi: 512Mi
    volumeMounts:
    - mountPath: /hugepages
      name: hugepages
    - mountPath: /var/run/vrouter/pod<num>
      name: shared-dir
  volumes:
  - name: shared-dir
    hostPath:
      path: /var/run/vrouter/pod<num>
  - name: hugepages
    emptyDir:
      medium: HugePages
  restartPolicy: Never
```

The bolded parameters above may be used to specify socket description data 217. The mountPath of volumeMounts for the shared directory ("shared-dir") of "/var/run/vrouter/pod<num>" can be used as the vhost socket path for socket 215A or to share data between CNI 206 and pod 202A. Another example mountPath may be "/var/run/vrouter/<podUID>" or "/var/run/vrouter/<podUUID>". The variable <num>, <podUID>, <podUUID> may be replaced by CNI 206 with a pod identifier, unique identifier, or universally unique identifier for pod 202A before including in socket description data 217 to virtual router agent 216. The hostPath for the shared-dir of volumes is similarly specified. A volume is a directory that is accessible to containers in a pod and are specified by the volumes structure. Orchestration agent 209 locally mounts each volume at the specified mountPath and maintains a host path list. A hostPath volume mounts a file or directory from the computing device 200 filesystem into a pod to provide access to data outside the pod, in the case of creating data interfaces 212, for accessing the socket directory ("shared-dir") for sockets 215. The hostPath path (here, "/var/run/vrouter/pod<num>") is for specifying a directory location on computing device 200. Once a container starts the container creates a path in the container and binds the path in the container to the corresponding host path. Again, pod<num> may be completed by CNI 206 that receives the incomplete hostPath path from orchestrator 23 by, e.g., communication or in the pod manifest.

CNI 206 may use a hostPath shared-dir mount with subPathExpr using a distinct pod identifier (or unique identifier, or uuid) to make the socket directory for socket 215A distinct, e.g., unique. The following is another example of a pod manifest using subPathExpr:

```
spec:
  containers:
  - name: multi-vhost-example
    env:
    - name: POD_UID
      valueFrom:
        fieldRef:
          fieldPath: metadata.uid
    image: dpdk-testpmd-app
    imagePullPolicy: Never
    securityContext:
      privileged: true
      command: ["tail", "-f", "/dev/null"]
    resources:
      requests:
        memory: 512Mi
      limits:
        hugepages-2Mi: 512Mi
    volumeMounts:
    - name: shared-dir
      mountPath: /vhu
      subPathExpr: $(POD_UID)
    - mountPath: /dev/hugepages
      name: hugepage
  volumes:
  - name: shared-dir
    hostPath:
      path: /var/run/vrouter
  - name: hugepage
    emptyDir:
      medium: HugePages
```

To create and use a unique socket directory for socket 215A, based on the above specification, the socket directory will be created as "/var/run/vrouter/<POD_UID>/" (hostPath path+$POD_UID [subPathExpr]). CNI 206 adds data interface 212A with a Port Add message to virtual router agent 216 that has been extended to include socket description data, here the socket directory and socket name. Virtual router agent 216 configures virtual router 220 with the new virtual network interface and includes the socket description data so that virtual router 220 can listen on or create the socket 215A based on the socket description data. Because CNI 206 does not receive UUID in the pod manifest, CNI 206 must be able to assume that the socket directory derivation logic is consistent, e.g., in the above example, /var/run/vrouter/<POD_UID>. If a user uses a different option than POD_UID, then socket 215A setup and data interface 212A setup may fail. The specification should be documented to communicate specification needs to the user.

In the above example, computing device 200 needs to have a "var/run/vrouter" directory before pods can be deployed. Orchestration agent 209 creates the directory called "var/run/router/<pod_UID>/dpdk0" at pod deployment and then mounts the path to "/vhu" for the workload. The workload can continue to use "/vhu" but on computing device 200, the contents will be available on the expanded unique path "var/run/vrouter/<pod_UID>/dpdk0".

A pod manifest may be further annotated to specify new interfaces types for DPDK-based virtual router 220 to pod 202 communications. New interface types to be specified may include virtio-user/tap or vhost-user interfaces. Below is an example schema for a pod manifest for one of pods 202:

```
    kind: Pod
    metadata:
      name: my-pod
      namespace: my-namespace
      annotations:
        k8s.v1.cni.cncf.io/networks: |
          [
            {
              "name":"network-a",
              "interface":"net1"
              "interfacetype": "vhost || virtio-user/veth",//For interface
type (DPDK/non DPDK
              "appvhost-mode":"client || server"//To validate compatibility
with vRouter vhost mode
            }
          ]
    spec:
      containers:
```

The interfacetype parameter may specify "vhost" or other string to indicate a DPDK pod or may specify virtio-user/veth to indicate a non-DPDK pod. In this way, computing device 200 may support and simultaneously execute a mix of DPDK and non-DPDK pods. The appvhost-mode parameter may specify whether the DPDK app of a pod is to run vhost in client mode or server mode. If virtual router 220 is not compatible with the specified mode, CNI 206 may return an error. Virtual router 220 may support veth interfaces, DPDK interfaces, virtio-user PMD to veth communications, vhost PMD to virtio-user (DPDK), virtio-user, and/or upstream vhost.

Configuration data for specifying operations of CNI 206 may include additional parameters to support the techniques here. Below is an example CNI configuration:

```
{
    "cniVersion": "0.3.1",
    "contrail" : {
        "cluster-name" : "k8s",
        "meta-plugin" : "multus",
        "vrouter-ip" : "127.0.0.1,
        "vrouter-port" : 9091,
        "config-dir" : "/var/lib/contrail/ports/vm",
        "poll-timeout" : 5,
        "poll-retries" : 15,
        "log-file"    : "/var/log/contrail/cni/opencontrail.log",
        "log-level"   : "4"
        "vrouter-mode" : "dpdk/kernel" //New configuration parameter
        "vhost-mode" : "server/client" //New configuration parameter
    },
    "name": "contrail-k8s-cni",
    "type": "contrail-k8s-cni"
}
```

The vrouter-mode parameter may be used to handle the default case. For example, if the pod annotation "interfacetype" (described above) is missing from a pod manifest, the default value for the interface type may be derived by CNI 206 from vrouter-mode—i.e., if DPDK, then an interface that supports DPDK such as vhost-user.

Figure 3:
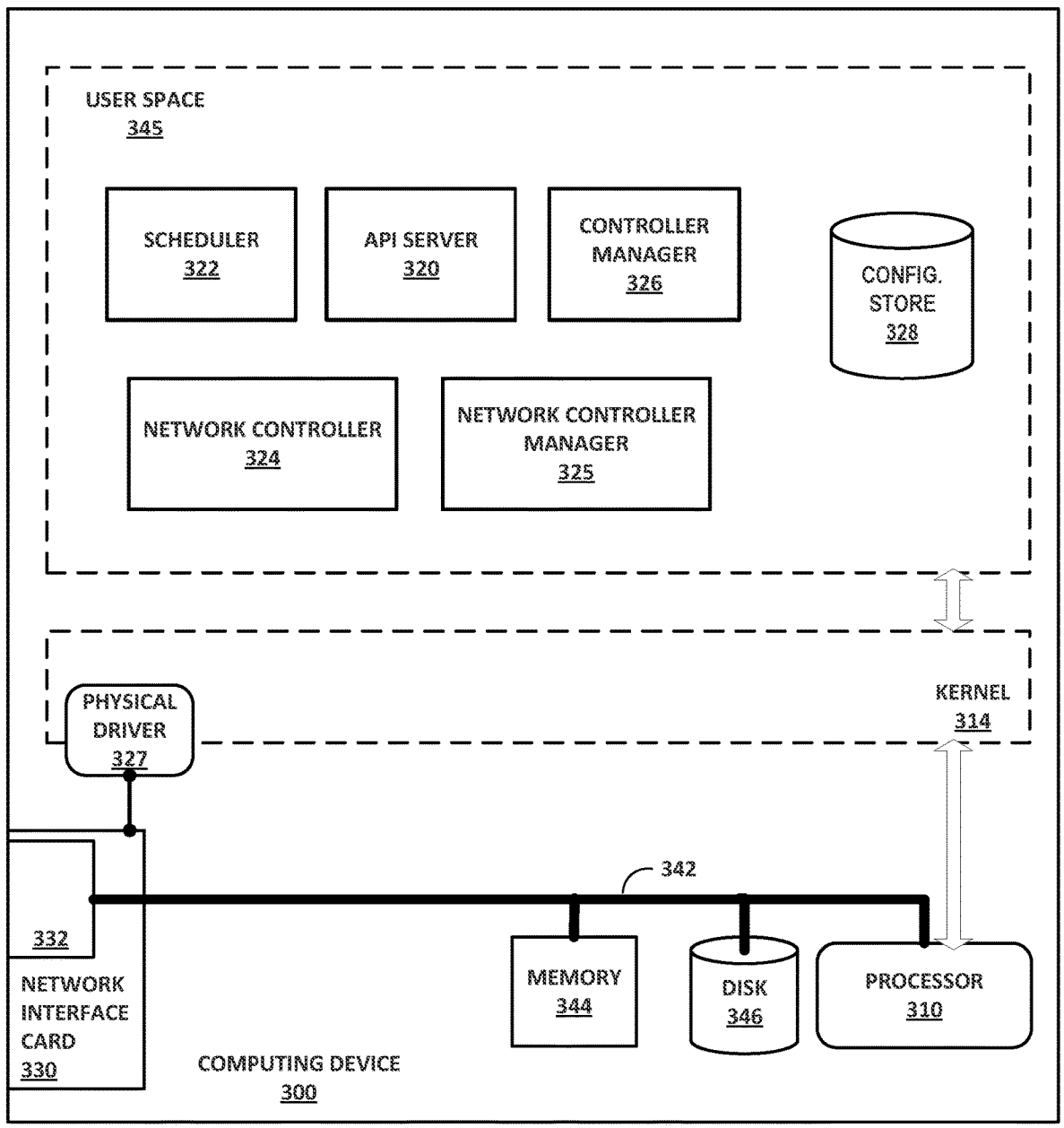
FIG. 3 is a block diagram of an example computing device operating as an instance of a controller and orchestrator for a virtualized computing infrastructure, according to techniques described in this disclosure.

FIG. 3 is a block diagram of an example computing device operating as an instance of controller and orchestrator for a virtualized computing infrastructure according to techniques described in this disclosure. Computing device 300 of FIG. 3 may represent a centralized or distributed system of one or more real or virtual servers configured to perform operations for at least one of a network controller 24 and an orchestrator 23. As such, computing device 300 may in some instances implement one or more master nodes for respective clusters.

Scheduler 322, API server 320, controller manager 326, network controller 324, network controller manager 325, and configuration store 328, although illustrated and described as being executed by a single computing device 300, may be distributed among multiple computing devices 300 that make up a computing system or hardware/server cluster. Each of the multiple computing devices 300, in other words, may provide a hardware operating environment for one or more instances of any one or more of scheduler 322, API server 320, controller manager 326, network controller 324, network controller manager 325, or configuration store 328. Network controller 324 may represent an example instance of network controller 24 of FIG. 1. Scheduler 322, API server 320, controller manager 326, and network controller manager 325 may implement an example instance of a component of orchestrator 23. Network controller manager 325 may represent an example implementation of a Kubernetes cloud controller manager or Kube-manager.

Computing device 300 includes in this example, a bus 342 coupling hardware components of a computing device 300 hardware environment. Bus 342 couples network interface card (NIC) 330, storage disk 346, and one or more microprocessors 310 (hereinafter, "processor 310"). A front-side bus may in some cases couple processor 310 and memory device 344. In some examples, bus 342 may couple memory device 344, processor 310, and NIC 330. Bus 342 may represent a Peripheral Component Interface (PCI) express (PCIe) bus. In some examples, a direct memory access (DMA) controller may control DMA transfers among components coupled to bus 242. In some examples, components coupled to bus 342 control DMA transfers among components coupled to bus 342.

Processor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and processor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel. Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in user space 345. Kernel 314 may include a physical driver 327 to use the network interface card 230.

Computing device 300 may be coupled to a physical network switch fabric that includes an overlay network that extends switch fabric from physical switches to software or "virtual" routers of physical servers coupled to the switch fabric, such virtual router 220 of FIG. 2. Computing device 300 may use one or more dedicated virtual networks to configure minion nodes of a cluster.

API server 320, scheduler 322, controller manager 326, and configuration store may implement a master node for a cluster and be alternatively referred to as "master components." The cluster may a Kubernetes cluster and the master node a Kubernetes master node, in which case the master components are Kubernetes master components.

API server 320 includes code executable by processor 310. API server 320 may be one or more computer processes. API server 320 validates and configures data for objects, such as virtual execution elements (e.g., pods of containers), services, and replication controllers, for instance. A service may be an abstraction that defines a logical set of pods and the policy used to access the pods. The set of pods implementing a service are selected based on the service definition. A service may be implemented in part as, or otherwise include, a load balancer. API server 320 may implement a Representational State Transfer (REST) interface to process REST operations and provide the frontend to a corresponding cluster's shared state stored to configuration store 328. API server 320 may authenticate and authorize requests. API server 320 communicates with other components to instantiate virtual execution elements in the computing infrastructure 8. API server 320 may represent a Kubernetes API server.

Configuration store 328 is a backing store for all cluster data. Cluster data may include cluster state and configuration data. Configuration data may also provide a backend for service discovery and/or provide a locking service. Configuration store 328 may be implemented as a key value store. Configuration store 328 may be a central database or distributed database. Configuration store 328 may represent an etcd store. Configuration store 328 may represent a Kubernetes configuration store.

Scheduler 322 includes code executable by processor 310. Scheduler 322 may be one or more computer processes. Scheduler 322 monitors for newly created or requested virtual execution elements (e.g., pods of containers) and selects a minion node on which the virtual execution elements are to run. Scheduler 322 may select a minion node based on resource requirements, hardware constraints, software constraints, policy constraints, locality, etc. Scheduler 322 may represent a Kubernetes scheduler.

In general, API server 320 may invoke the scheduler 322 to schedule a pod, which may select a minion node and returns an identifier for the selected minion node to API server 320, which may write the identifier to the configuration store 328 in association with the virtual execution element. API server 320 may invoke the orchestration agent 209 for the selected minion node, which may cause the container engine 208 for the selected minion node to obtain the pod from a storage server and create the pod on the minion node. The orchestration agent 209 for the selected minion node may update the status for the virtual execution element to the API server 320, which persists this new state to the configuration store 328. In this way, computing device 300 instantiates new pods in the computing infrastructure 8, e.g., to servers 12.

Controller manager 326 includes code executable by processor 310. Controller manager 326 may be one or more computer processes. Controller manager 326 may embed the core control loops, monitoring a shared state of a cluster by obtaining notifications from API Server 320. Controller manager 326 may attempt to move the state of the cluster toward the desired state. Example controllers (not shown) managed by the controller manager 326 may include a replication controller, endpoints controller, namespace controller, and service accounts controller. Controller manager 326 may perform lifecycle functions such as namespace creation and lifecycle, event garbage collection, terminated pod garbage collection, cascading-deletion garbage collection, node garbage collection, etc. Controller manager 326 may represent a Kubernetes Controller Manager for a Kubernetes cluster.

Network controller 324 includes code executable by processor 310. Network controller 324 may include one or more computer processes. Network controller 324 may be implemented using virtual machines, containers, or as native processes. The network controller 324 may be a logically centralized but physically distributed Software Defined Networking (SDN) controller that is responsible for providing the management, control, and analytics functions of a virtualized network. In particular, network controller 324 may be a logically centralized control plane and management plane of the computing infrastructure 8 and orchestrates virtual routers for one or more minion nodes.

Network controller 324 may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, WC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

Network controller 324 may provide network function virtualization (NFV) to networks, such as business edge networks, broadband subscriber management edge networks, and mobile edge networks. NEV involves orchestration and management of networking functions such as a Firewalls, Intrusion Detection or Preventions Systems (IDS/IPS), Deep Packet inspection (DPI), caching, Wide Area Network (WAN) optimization, etc. in virtual machines, containers, or other virtual execution elements instead of on physical hardware appliances. The main drivers for virtualization of the networking services in this market are time to market and cost optimization.

Network controller 324 programs network infrastructure elements to create virtual networks and may create interface configurations for virtual network interfaces for the virtual networks.

Additional information regarding network controller 24 operating in conjunction with other devices of data center 10 or other software-defined network is found in International Application Number PCT/US2013/044378 and in U.S. patent application Ser. No. 14/226,509, incorporated by reference above.

Network controller manager 325 includes code executable by processor 310. Network controller manager 325 may be one or more computer processes. Network controller manager 325 operates as an interface between the orchestration-oriented elements (e.g., scheduler 322, API server 320, controller manager 326, and configuration store 328) and network controller 324. In general, network controller manager 325 monitors the cluster for new objects (e.g., pods and services). Network controller manager 325 may isolate pods in virtual networks and connect pods with services.

Network controller manager 325 may be executed as a container of the master node for a cluster. In some cases, using network controller manager 325 enables disabling the service proxies of minion nodes (e.g., the Kubernetes kube-proxy) such that all pod connectivity is implemented using virtual routers, as described herein.

Network controller manager 325 may use the controller framework for the orchestration platform to listen for (or otherwise monitor for) changes in objects that are defined in the API and to add annotations to some of these objects. The annotations may be labels or other identifiers specifying properties of the objects (e.g., "Virtual Network Green"). Network controller manager 325 may create a network solution for the application using an interface to network controller 324 to define network objects such as virtual networks, virtual network interfaces, and access control policies. Network controller 324 may implement the network solution in the computing infrastructure by, e.g., configuring the one or more virtual network and virtual network interfaces in the virtual routers.

The following example deployment configuration for this application consists of a pod and the virtual network information for the pod:

```
apiVersion: v1
kind: Pod
metadata:
  name: multi-net-pod
  annotations:
    networks: [
    {
      "name":"network-a",
      "interface":"net1",
        "interfacetype": "vhost || virtio-user/veth",//For interface type (DPDK/non DPDK)
        "appvhost-mode":"client || server"//To validate compatibility with vRouter vhost mode
    }
    ]'
```

-continued

```
spec:
  containers:
  - name: client-pod
    image: dpdk-testpmd-app
    imagePullPolicy: Never
    securityContext:
        privileged: true
    command: ["tail", "-f", "/dev/null"]
    resources:
      requests:
        memory: 512Mi
      limits:
        hugepages-2Mi: 512Mi
    volumeMounts:
    - mountPath: /hugepages
      name: hugepages
    - mountPath: /var/run/vrouter/pod<num>
      name: shared-dir
  volumes:
  - name: shared-dir
    hostPath:
      path: /var/run/vrouter/pod<num>
  - name: hugepages
    emptyDir:
      medium: HugePages
  restartPolicy: Always
```

This metadata information is copied to each pod replica created by the controller manager 326. When the network controller manager 325 is notified of these pods, network controller manager 325 may create virtual networks as listed in the annotations ("red-network", "blue-network", and "default/extns-network" in the above example) and create, for each of the virtual networks, a virtual network interface per-pod replica (e.g., pod 202A) with a unique private virtual network address from a cluster-wide address block (e.g. 10.0/16) for the virtual network.

In accordance with techniques of this disclosure, network controller manager 325 may obtain the new network annotations for a pod manifest for specifying an interface type (e.g., "interfacetype") and/or specifying a vhost mode (e.g., "appvhost-mode") for a virtual network interface. Network controller manager 325 may pass this network annotation data to network controller 324, which provides the network annotation data to virtual router agent 216. The network annotation data may be included with the interface configuration data for configuring a virtual network interface for a pod, as described above with respect to FIGS. 1-2. If the interface type annotation indicates to create a DPDK type of interface, virtual router 220 may connect with the DPDK app of the pod using the indicated vhost mode, to negotiate a socket for the DPDK interface between the pod and virtual router 220.

Various components, functional units, and/or modules illustrated in FIGS. 1-3 and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Figure 4:
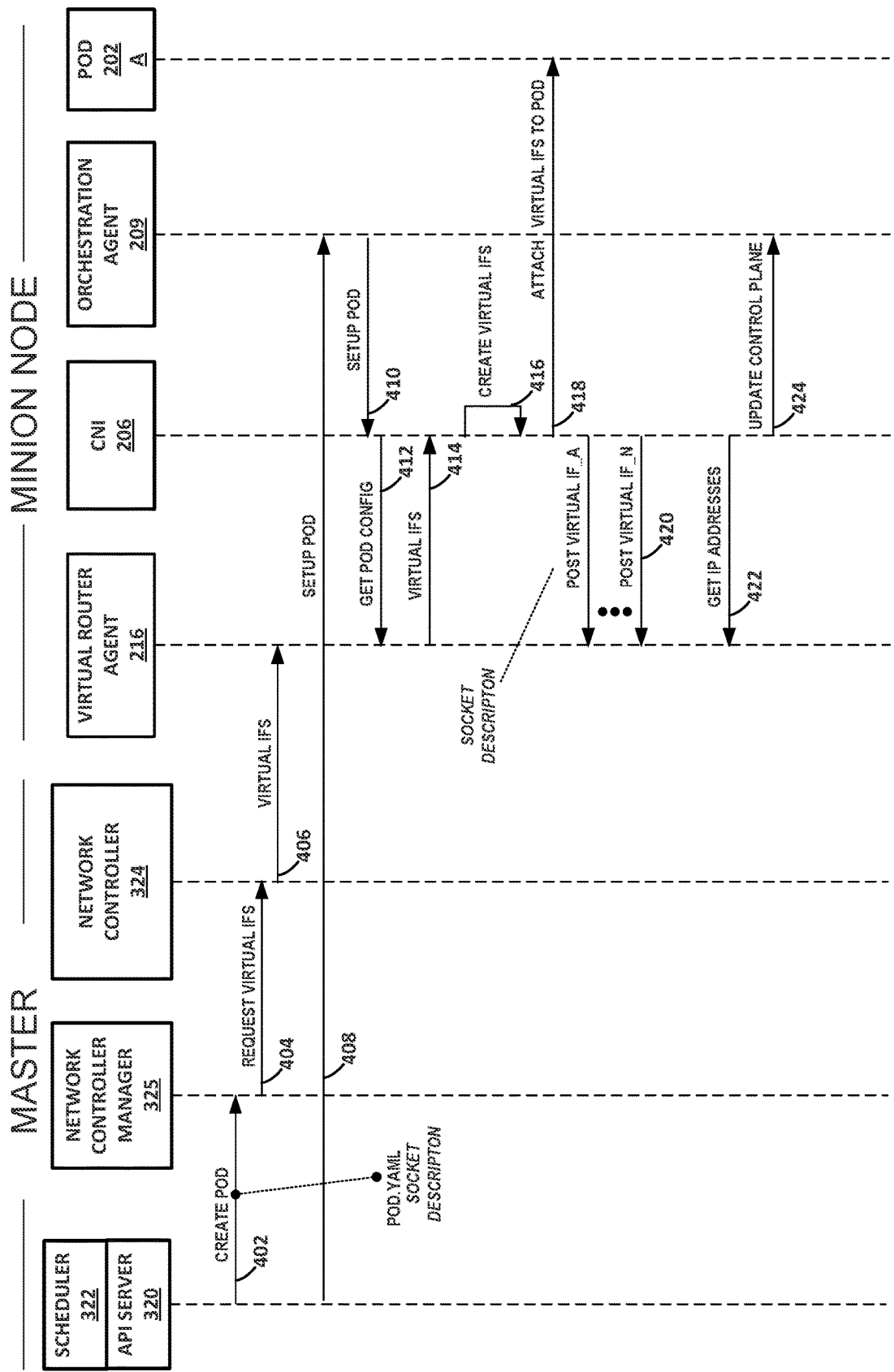
FIG. 4 is a flow diagram illustrating one example workflow for creating a data interface between a pod and a virtual router, according to some aspects described in this disclosure.

FIG. 4 is a flow diagram illustrating one example workflow for creating a data interface between a pod and a virtual router, according to some aspects described in this disclosure. For purposes of example, the operations are described with respect to components of computing devices 200 and 300 of FIGS. 2-3. API server 320 receives a request to instantiate a pod 202A and modifies the configuration store 328 by generating and storing configuration information for creating the pod 202A (402). The pod specification (pod.yaml) includes data for generating socket description data. Scheduler 322 may select the computing device 200 as the host minion node for the pod 202A. API server 320 may annotate the pod 202A with a list of one or more virtual networks and an identifier for the pod (e.g., a universally unique identifier (pod_uuid), or simply a unique identifier (pod_uid)). Other forms of identifiers for the pod may be used. The annotations may be labels for the pod configuration that indicate the virtual networks, such as "virtual network A" and "virtual network B". The annotations may also indicate that the interface for a virtual network should be a DPDK interface (e.g., using "interfacetype").

Network controller manager 325 listens for new objects from API server 320 and determines that pod 202A is to be instantiated on computing device 200 and determines, from the annotations, that the pod 202A requires a virtual network interface with a virtual network indicated in the annotations. The listening may be in response to subscribing to API server 320 notifications on a RESTful interface, for example.

Network controller manager 325 directs network controller 324 to create the virtual networks and to create virtual network interfaces for the pod 202A for the virtual networks (404). Network controller manager 325 may annotate the pods with respective uuids for the one or more virtual network interfaces (e.g., vni_uuids) to be created by network controller 324 as well as the allocated, respective unique private virtual network addresses (and in some cases MAC addresses). Other forms of identifiers for the virtual network interfaces may be used.

Network controller 324 may associate virtual network interfaces with the pod in interface configuration data for the pod 202A. For example, network controller 324 may create a list of virtual network interfaces for the virtual networks and may associate the vni_uuids with the pod_uuid in interface configuration data for the pod 202A. The vni-uuids may be another identifier for the virtual network interfaces, such as virtual machine interface identifiers. Network controller 324 may send the interface configuration data 25 to the virtual router agent 216 for virtual router 220 of computing device 200 and configure corresponding virtual network interfaces 212 in the computing device 200 (406). Virtual router agent 216 may store an association of each vni_uuid with the corresponding configured virtual network interface.

To set up the pod 202A, orchestration agent 209 obtains container specification data for pod 202A and ensures the containers execute by computing device 200 (408). The container specification data may include the pod_uuid for pod 202A. The orchestration agent 209 invokes a CNI 206 to configure the virtual network interfaces for the pod 202A (410). CNI 206 requests (412) and obtains the interface configuration data from virtual router agent 216 (414). CNI 206 may obtain the interface configuration data from virtual router agent 216 by requesting the interface configuration data for the pod corresponding to the pod_uuid included in the container specification data for pod 202A.

To create each of the virtual network interfaces 212 indicated in interface configuration data 25 (416), CNI 206 may cause an interface to be created in pod 202A by passing in configuration data (418) and may make any necessary changes on the computing device 200. The configuration data in step 418 may include, e.g., IP address (IPv4/IPv6), MAC, DNS configuration, MTU, interface name, and vhost socket dir path and socket name for vhost control channel (socket 215A) to DPDK application POD 202A.

CNI 206 notifies virtual router agent 216 of the now-operational (by virtue of configuration by pod 202A) virtual network interfaces 212 with corresponding Port Add messages (420). CNI 206 may also obtain the virtual network addresses from the virtual router agent 216 (422) or by invoking an appropriate IPAM plugin. CNI 206 may configure the virtual network addresses inside the pod 202A network namespace and may set up routes by invoking the virtual router agent 216. Alternatively, CNI 206 may configure the virtual network addresses inside the pod 202A network namespace and may set up routes consistent with the IP Address Management section by invoking an appropriate IPAM plugin. CNI may update the orchestration control plane by notifying orchestration agent 209 (424).

FIG. 5 is a block diagram illustrating an example computing device 500 having a DPDK-based virtual router and a containerized DPDK workload, with interfaces established according to one or more aspects of this disclosure. Virtual router agent 504 may represent an example instance of virtual router agent 216. vRouter DPDK data plane 502 (hereinafter, "virtual router 502") may represent an example instance of virtual router 220 or any of DPDK vRouters 21. Virtual router 502 executes the "forwarding plane" or packet forwarding functionality of the virtual router for computing device 500 and virtual router agent 504 executes the "control plane" functionality of the virtual router.

Virtual router agent 504 includes configuration data 534, virtual routing and forwarding instances configurations 536 ("VRFs 536"), and policies 538. Virtual router agent 504 exchanges control information with one or more virtual network controllers (e.g., network controller 24 of FIG. 1). Control information may include, virtual network routes, low-level configuration state such as routing instances and forwarding policy for installation to configuration data 534, VRFs 536, and policies 538. Virtual router agent 504 may also report analytics state and install forwarding state to forwarding information 526 of virtual router 502. Virtual router agent 504 may apply slow-path packet processing for the first (initial) packet of each new flow traversing virtual router 502 and installs corresponding flow entries to flow tables for the new flows for fast path processing by virtual router 502 for subsequent packets of the flows. Forwarding information 526 may include separating forwarding information 528A-528N for corresponding VRFs 536.

Virtual router 502 may include multiple logical forwarding cores 510, which may be pthreads. Cores 510 may run in a tight loop, also called the poll mode. They can exchange packets among themselves using DPDK queues. Each of cores 510 has a receive queue, which can be used by other cores 510 to enqueue packets that need to be processed by that core. They also poll different virtual router 502 interfaces queues like physical, VM, and tap. Virtual router 502 may thus be a multi-threaded user space application. Forwarding cores 510 poll the physical and virtual interfaces. In addition, forwarding cores 510 can do the virtual router 502 packet processing according to a packet processing pipeline.

A particular forwarding core of cores 510 (the "vhost core") handles the messages between DPDK pod 506 and virtual router 502 on the vhost-user control channel 562, in either client mode or server mode. The communication with DPDK pod 506 is through UNIX socket 560. Once the communication channel is established, the userspace vhost protocol takes place. During this protocol message exchange, pod 506 and the vRouter exchange information about the pod memory regions, virtio ring addresses, and the supported features. At the end of the message exchange, the virtio ring 522 over shared memory 520 is enabled and data communication between pod 506 and virtual router 502 can occur. In this way, the rings 522 and control channel 562 make up a virtual network interface for pod 506 that is a DPDK interface. As described above, the virtual network interface is configured with network configuration data (e.g., overlay/virtual IP address) for forwarding packets sourced by or destined to pod 506.

Pod 506 is a DPDK-enabled pod, and DPDK native application 508 is a DPDK-enabled, containerized application that uses virtio PMD 516 and virtio device 517 to set up DPDK rings mapped on virtio rings and exchange overlay packets with virtual router 502.

Another of cores 510 is responsible for sending and receiving packets between virtual router agent 504 and virtual router 502. The initialization sequence for this communication is triggered once a virtual router agent to virtual Netlink channel 552 (e.g., over a socket) has been established. Virtual router agent 504 adds the "pkt0" or the "vif 0/2" interface to the virtual router 502 process using the Netlink channel. Virtual router 502 then creates a UNIX socket in the path "/var/run/vrouter/dpdk_pkt0". This socket will be used by virtual router agent 504 to send packets to virtual router 502. In addition, it connects to another UNIX socket which the vRouter agent has already created. The path for the virtual router agent 504 UNIX socket is "/var/run/vrouter/agent_pkt0". This socket will be used by the virtual router 502 to send packets to virtual router agent 504. The socket protocol is of type PACKET, meaning that the channel only carries packets.

Interface vif 0/1 connects to vhost0, the interface in the Linux kernel. A separate management interface 544 connects eth0 540 of pod 506 and virtio/tap interface 542 of virtual router 502.

Contrail or Tungsten Fabric is an example network control architecture. CNI 206 may be developed for Contrail or Tungsten Fabric. A Contrail/Tungsten Fabric controller may be an example of network controller 24.

Figure 6:
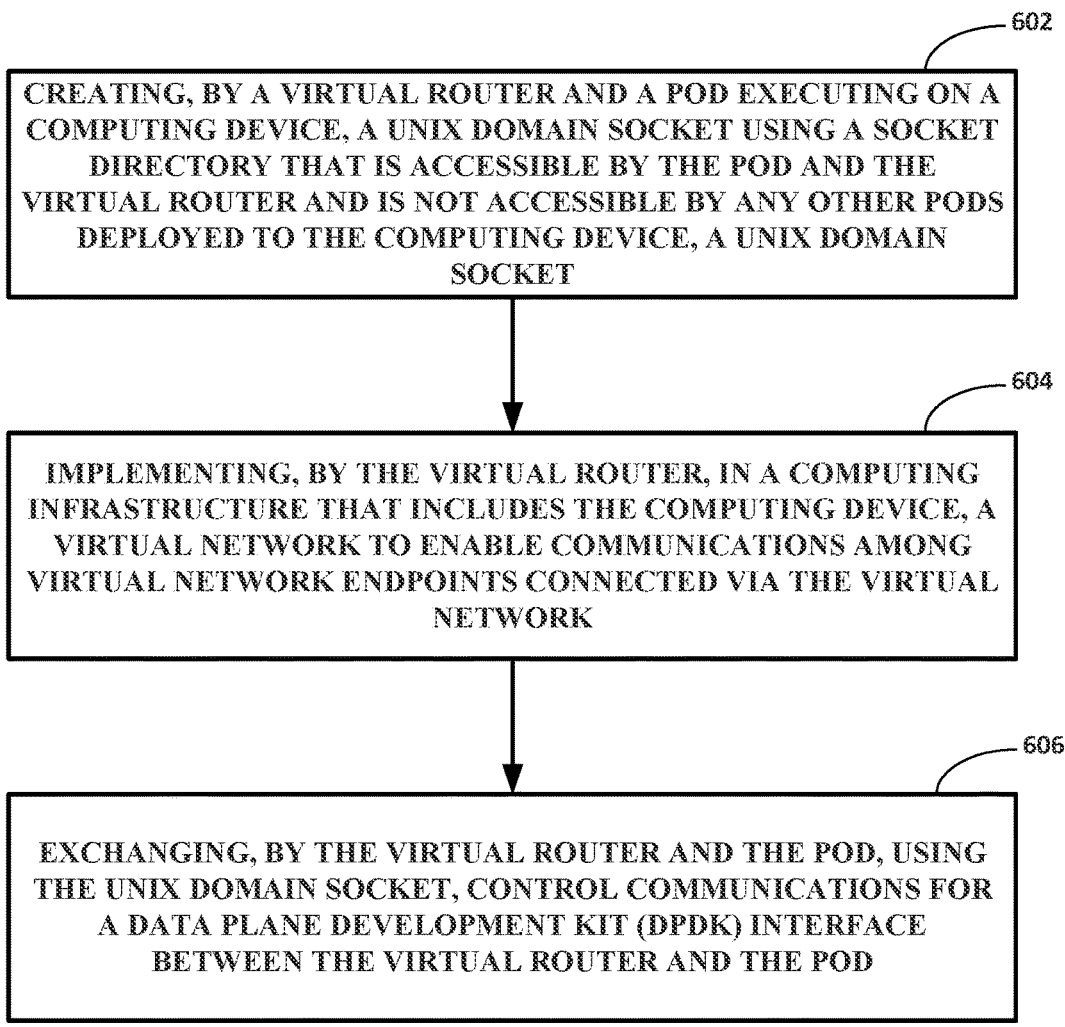
FIG. 6 is a flowchart illustrating an example mode of operation of components of a computing device, according to techniques described here.

FIG. 6 is a flowchart illustrating an example mode of operation of components of a computing device, according to techniques described here. Virtual router 220 and DPDK-enabled pod 202A create a Unix domain socket 215A using a socket directory that is accessible by pod 202A and is not accessible by any other pods (other than a pod that includes virtual router 220) deployed to computing device 200, such as pod 202B (602). Virtual router 220 implements in a computing infrastructure that includes computing device 200, a virtual network to enable communications among virtual network endpoints connected via the virtual network (1604). The virtual network endpoints may include pod 202A. Using Unix domain socket 215A, virtual router 220 and pod 202A exchange control communications for DPDK-based data interface 212A between virtual router 220 and pod 202A (606).

FIG. 7 is a flowchart illustrating an example mode of operation of an orchestrator, according to techniques described here. Although described with respect to orchestrator 23, operation 700 may be performed by any orchestrator or orchestration system described herein. Orchestrator 23 obtains a pod specification for a pod (702). The pod specification includes data for generating socket description data that indicates a file system resource to be used by the pod, when the pod is deployed to a computing device, for creating a Unix domain socket that is accessible by the pod and not accessible by any other pods deployed to the computing device. Orchestrator 23 outputs the pod specification to an orchestration agent executing on the computing device, wherein the orchestration agent is an agent of the orchestrator (704).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing device comprising:
    a virtual router comprising processing circuitry and configured to implement, in a computing infrastructure that includes the computing device, a virtual network to enable communications among virtual network endpoints connected via the virtual network; and
    a pod comprising a containerized application,
    wherein the virtual router and the pod are configured to create a Unix domain socket using a file system resource of a file system of the computing device, wherein the file system resource is accessible by the pod and by the virtual router and is not accessible by any other pods deployed to the computing device.

2. The computing device of claim 1, wherein the file system resource comprises a socket directory for the Unix domain socket.

3. The computing device of claim 1, wherein the virtual router and the pod are configured to use the Unix domain socket as a control channel to exchange control communications for a data interface between the virtual router and the pod.

4. The computing device of claim 3, wherein the data interface comprises a data plane development kit (DPDK) interface.

5. The computing device of claim 3, wherein the data interface is for a virtual network interface configured in the virtual router for the pod to communicate with other virtual network endpoints of the virtual network.

6. The computing device of claim 1, further comprising:
    a container network interface module (CNI) comprising processing circuitry; and
    a virtual router agent for the virtual router, the virtual router agent comprising processing circuitry,
    wherein the CNI is configured to send socket description data that indicates the file system resource to the virtual router agent, and
    wherein the virtual router agent provides the socket description data to the virtual router to create the Unix domain socket.

7. The computing device of claim 6, wherein the CNI is configured to generate the socket description data that indicates the file system resource based on a pod identifier for the pod.

8. The computing device of claim 7, further comprising:
    an orchestration agent comprising processing circuitry, wherein the orchestration agent is an agent of an orchestrator for the computing infrastructure that includes the computing device,
    wherein the CNI is configured to receive the pod identifier from the orchestrator via the orchestration agent.

9. The computing device of claim 6, wherein the virtual router agent is configured to create a virtual network interface in the virtual router that uses a data interface between the virtual router and the pod created using the Unix domain socket.

10. The computing device of claim 1, further comprising:
    a container network interface module (CNI) comprising processing circuitry; and
    an orchestration agent comprising processing circuitry, wherein the orchestration agent is an agent of an orchestrator for the computing infrastructure that includes the computing device,
    wherein the file system resource comprises a socket directory for the Unix domain socket, and
    wherein the CNI is configured to receive a pod identifier for the pod from the orchestrator via the orchestration agent and to generate, based on the pod identifier, socket description data that indicates the socket directory and a socket name for the Unix domain socket.

11. The computing device of claim 1, wherein the file system resource is a directory having a directory path that includes at least a portion of a pod identifier for the pod.

12. The computing device of claim 1, further comprising:
    a virtual router agent for the virtual router, the virtual router agent comprising processing circuitry and configured to:
    receive interface configuration data from a network controller for the computing infrastructure, wherein the interface configuration data is for a virtual network interface for the pod, and wherein the interface configuration data indicates an interface type of the virtual network interface is a DPDK interface; and
    in response to a determination the virtual network interface is a DPDK interface, configure the virtual network interface in the virtual router as a DPDK interface.

13. The computing device of claim 1, further comprising:
    a virtual router agent for the virtual router, the virtual router agent comprising processing circuitry and configured to:
    receive interface configuration data from a network controller for the computing infrastructure, wherein the interface configuration data is for a virtual network interface for the pod, and wherein the interface configuration data indicates a vhost mode for the pod for exchanging control communications via the Unix domain socket; and
    in response to a determination the vhost mode for the pod is not compatible with a vhost mode for the virtual router, output an error.

14. The computing device of claim 1, further comprising:
    a container network interface module (CNI) comprising processing circuitry;
    a virtual router agent for the virtual router, the virtual router agent comprising processing circuitry,
    wherein the CNI is configured to obtain, from an orchestrator, using a webhook, socket description data that indicates the file system resource,
    wherein the CNI is configured to send the socket description data to the virtual router agent, and
    wherein the virtual router agent provides the socket description data to the virtual router to create the Unix domain socket.

15. A method comprising:
    obtaining, by an orchestrator, a pod specification for a pod, wherein the pod specification includes data for generating socket description data that indicates a file system resource of a file system of a computing device to be used by the pod, when the pod is deployed to the computing device, for creating a Unix domain socket, wherein the file system resource is accessible by the pod and not accessible by any other pods deployed to the computing device; and outputting, by the orchestrator, the pod specification to an orchestration agent executing on the computing device, wherein the orchestration agent is an agent of the orchestrator.

16. The method of claim 15, further comprising:

deploying, by the orchestration agent, the pod to the computing device; and mounting, by the orchestration agent, the file system resource into the pod.

17. The method of claim 15, wherein the socket description data includes a mountPath for a shared directory to be shared by the pod and a virtual router of the computing device and a subPathExpr that is a pod identifier for the pod.

18. A method comprising:

creating, by a virtual router and a pod executing on a computing device, a Unix domain socket using a socket directory of a file system of the computing device, wherein the socket directory is accessible by the pod and by the virtual router and is not accessible by any other pods deployed to the computing device;

implementing, by the virtual router, in a computing infrastructure that includes the computing device, a virtual network to enable communications among virtual network endpoints connected via the virtual network; and exchanging, by the virtual router and the pod, using the Unix domain socket, control communications for a data plane development kit (DPDK) interface between the virtual router and the pod.

19. The method of claim 18, wherein the DPDK interface is for a virtual network interface configured in the virtual router for the pod to communicate with other virtual network endpoints of the virtual network.

20. The method of claim 18, wherein a path of the socket directory is based on an identifier for the pod.

* * * * *